(12) United States Patent
Mitra et al.

(10) Patent No.: US 8,411,081 B2
(45) Date of Patent: Apr. 2, 2013

(54) SYSTEMS AND METHODS FOR ENHANCING SYMMETRY IN 2D AND 3D OBJECTS

(75) Inventors: Niloy J. Mitra, New Delhi (IN); Leonidas J. Guibas, Palo Alto, CA (US); Mark Pauly, Zurich (CH)

(73) Assignee: The Board of Trustees of the Leland Stanford Jr. University, Palo Alto, CA (US)

( * ) Notice: Subject to any disclaimer, the term of this patent is extended or adjusted under 35 U.S.C. 154(b) by 967 days.

(21) Appl. No.: 12/481,197

(22) Filed: Jun. 9, 2009

(65) Prior Publication Data
US 2010/0066760 A1    Mar. 18, 2010

Related U.S. Application Data

(60) Provisional application No. 61/059,991, filed on Jun. 9, 2008.

(51) Int. Cl.
*G06T 15/00* (2011.01)
(52) U.S. Cl. ......... 345/419; 345/418; 345/619; 345/629
(58) Field of Classification Search .................. 345/418, 345/419, 629, 619
See application file for complete search history.

(56) References Cited

PUBLICATIONS

Mitra et al. "Partial and Approximate Symmetry Detection for 3D Geometry", SIGGRAPH 2006, Jul. 2006, pp. 560-568.*
Mitra et al. "Symmetrization", SIGGRAPH 2007, Aug. 2007, pp. 63-1-63-8.*
Alliez, P., Cohen-Steiner, D., Devillers, O., Levy, B., and Desbrun, M.; Anisotropic polygonal remeshing; ACM Transactions on Graphics vol. 22, Issue 3; Jul. 2003; p. 485-493.
Alliez, P., Cohen-Steiner, D., Yvinec, M., and Desbrun, M.; Variational tetrahedral meshing; ACM Transactions on Graphics vol. 24, Issue 3; Jul. 2005; p. 617-625.
Amato, N. M., Bayazit, O. B., Dale, L. K., Jones, C., and Vallejo, D.; Choosing good distance metrics and local planners for probabilistic roadmap methods; IEEE Trans. on Robotics and Automation, Aug. 2000; p. 442-447.
Amenta, N., and Bern, M.; Surface reconstruction by voronoi filtering; ACM Proceedings of the 14th Annual Symposium on Computational Geometry, Jun. 1998; p. 39-48.
Atallah, M.; On symmetry detection; IEEE Trans. on Computers; Jul. 1985; p. 663-666.
Attali, D., Boissonnat, J., and Edelsbrunner, H.; Stability and computation of the medial axis—a state-of-the-art report; Mathematical Foundations of Scientific Visualization, Computer Graphics, and Massive Data Exploration; 2009, p. 109-125.

(Continued)

*Primary Examiner* — Michelle L Sams
(74) *Attorney, Agent, or Firm* — Wong, Cabello, Lutsch, Rutherford & Brucculeri, LLP

(57) ABSTRACT

Systems and methods for enhancing symmetry in 2D and 3D objects are disclosed. At least some embodiments include a computer-readable storage medium including software (executable on a processor) to symmetrize a modeled physical object that causes the processor to identify a plurality of clusters (each including a plurality of symmetric point pairs each derived from a plurality of sampled surface points of the object), and to calculate and apply each of a first plurality of displacement value pairs to corresponding sample positions of the symmetric point pairs within at least one cluster, increasing the symmetry of the cluster. The software further causes the processor to calculate a second plurality of displacement value pairs, to contract the cluster using the second plurality of displacement value pairs, to merge two or more clusters within the transformation space, and to present a graphical representation of the symmetrized modeled physical object to a user.

20 Claims, 14 Drawing Sheets

PUBLICATIONS

Blum, H.; A transformation for extracting descriptors of shape; In Models for the Perception of Speech and Visual Forms; MIT Press; 1967; p. 362-380.

Boissonnat, J. D., and Oudot, S.; Provably good surface sampling and approximation; ACM Proceedings of the 2003 Eurogrpahics/ACM Siggraph Symposium on Geometry Processing; 2003; p. 9-18.

Botsch, M., Pauly, M., Gross, M., and Kobbelt, L. 2006; Primo: Coupled prisms for intuitive surface modeling; Proc. Of the 4th Europgraphics Symposium on Geometry Processing; 2006; p. 11-22.

Cohen-Steiner, D., and Morvan, J.-M.; Restricted Delaunay triangulations and normal cycle; ACM Proceedings of the 19th Annual Symposium on Computational Geometry; 2003; p. 312-321.

Comaniciu, D., and Meer, P.; Mean shift: A robust approach toward feature space analysis; IEEE Pattern Analysis and Machine Intelligence, vol. 24, Issue 5; May 2002; p. 603-609.

Eggert, D. W., Lorusso, A., and Fisher, R. B.; Estimating 3-d rigid body transformations: a comparison of four major algorithms; Machine Vision and Applications; Mar. 1997 vol. 9, Issue 5-6; p. 272-290.

Fischler, M. A., and Bolles, R. C.; Random sample consensus: A paradigm for model fitting with applications to image analysis and automated cartography; Comm. of the ACM; Jun. 1981, vol. 24, Issue 6; p. 381-395.

Funkhouser, T., and Shilane, P.; Partial matching of 3D shapes with priority-driven search; Proceedings of the 4th Eurographics Symposium on Geometry Processing; 2006; p. 131-142.

Gal, R., and Cohen-Or, D.; Salient geometric features for partial shape matching and similarity; ACM Transactions on Graphics; Jan. 2006, vol. 25, Issue 1; p. 130-150.

Garland, M., and Heckbert, P. S.; Surface simplification using quadric error metrics; ACM Proceedings of the 24th Annual Conference on Computer Graphics and Interactive Techniques, SIGGRAPH '97; p. 209-216.

Gonnet, G.; Expected length of the longest probe sequence in hash code searching; Journal of the Association for Computing Machinery; Apr. 1981, vol. 28, Issue 2; p. 289-304.

Hofer, M., Pottmann, H., and Ravani, B.; From curve design algorithms to the design of rigid body motions; The Visual Computer: International Journal of Computer Graphics; Jul. 2004, vol. 20, Issue 5; p. 279-297.

Igarashi, T., Moscovich, T., and Hughes, J. F.; As-rigid-as-possible shape manipulation; ACM Transactions on Graphics; Jul. 2005, vol. 24, Issue 3; p. 1134-1141.

James, D. L., and Twigg, C. D.; Skinning mesh animations; ACM Transactions on Graphics; Jul. 2005, vol. 24, Issue 3; p. 399 407.

Kazhdan, M. M., Chazelle, B., Dobkin, D. P., Finkelstein, A., and Funkhouser, T. A.; A reflective symmetry descriptor; Proceedings of the 7th European Conference on Computer Vision; 2002; p. 642-656.

Kazhdan, M., Funkhouser, T., and Rusinkiewicz, S.; Symmetry descriptors and 3d shape matching; Proceedings of the 2004 Eurographics/ACM Symposium on Geometry Processing; 2004; p. 116-125.

Liu, Y., Collins, R., and Tsin, Y.; A computational model for periodic pattern perception based on frieze and wallpaper groups; IEEE Transactions on Pattern Analysis and Machine Intelligence; Mar. 2004, vol. 26, Issue 3; p. 354-371.

Manay, S., Hong, B.-W., Yezzi, A. J., and Soatto, S.; Intergral invariant signatures; Proceedings of the 8th European Conference on Computer Vision; May 2004; p. 87-99.

Martinet, A., Soler, C., Holzschuch, N., and Sillion, F.; Accurate detection of symmetries in 3d shapes; ACM Transactions on Graphics; Apr. 2006, vol. 25, Issue 2; p. 439-464.

Mitra, N. J., Gelfand, N., Pottmann, H., and Guibas, L.; Registration of point cloud data from a geometric optimization perspective; Proceedings of the 2004 Eurographics/ACM Symposium on Geometry Processing; 2004; p. 23-31.

Pauly, M., Keiser, R., and Gross, M. 2003; Multi-scale feature extraction on point-sampled models; Proceedings of Eurographics 2003; Oct. 2003; p. 281-289.

Pauly, M., Mitra, N. J., Giesen, J., Gross, M., and Guibas, L; Example-based 3d scan completion; Proceedings of the 3rd Eurographics Symposium on Geometry Processing; 2005; p. 23-32.

Podolak, J., Shilane, P., Golovinskiy, A., Rusinkiewicz, S., and Funkhouser, T.; A planar-reflective symmetry transform for 3d shapes; ACM Transactions on Graphics; Jul. 2006; vol. 25, Issue 3; p. 549-559.

Raab, M., and Steger, A.; "Balls into Bins"—A simple and tight analysis; '98 Proceedings of the Second International Workshop on Randomization and Approximation Techniques in Computer Science; 1998; p. 159-170.

Rusinkiewicz, S., and Levoy, M.; Efficient variants of the ICP algorithm; Third International Conference on 3-D Digital Imaging and Modeling; 2001; p. 145 152.

Simari, P., Kalogerakis, E., and Singh, K.; Folding meshes: Hierarchical mesh segmentation based on planar symmetry; Proceedings of the 4th Eurographics Symposium on Geometry Processing; 2006; p. 111-119.

Thrun, S., and Wegbreit, B.; Shape from symmetry; Proceedings of the International Conference on Computer Vision; 2005; vol. 2, p. 1824-1831.

Tuzel, O., Subbarao, R., and Meer, P.; Simultaneous multiple 3d motion estimation via mode finding on lie groups; Proceedings of the International Conference on Computer Vision; 2005; vol. 1, p. 18-25.

Wolfson, H. J., and Rigoutsos, I.; Geometric hashing: An overview; IEEE Computational Science & Engineering; Oct. 2004, vol. 4, Issue 4; p. 10-21.

Wolter, J., Woo, T., and Volz, R.; Optimal algorithms for symmetry detection in two and three dimensions; The Visual Computer; Jul. 1985, p. 37-48.

Zabrodsky, H., and Weinshall, D.; Using bilateral symmetry to improve 3D reconstruction from image sequence; Computer Vision and Image Understanding; Jul. 1997, vol. 67, Issue 1; p. 48-57.

Zabrodsky, H., Peleg, S., and Avnir, D.; Symmetry as a continuous feature; IEEE Transactions on Pattern Analysis and Machine Intelligence; Dec. 1995, vol. 17, Issue 12; p. 1154-1166.

* cited by examiner

SYSTEMS AND METHODS FOR ENHANCING SYMMETRY IN 2D AND 3D OBJECTS

RELATED APPLICATIONS

The present disclosure claims priority to U.S. Provisional Patent Application No. 61/059,991, entitled "System and Methods for Enhancing Symmetry in 2D and 3D Objects" and filed on Jun. 9, 2008, which is herby incorporated by reference.

STATEMENT REGARDING FEDERALLY SPONSORED RESEARCH OR DEVELOPMENT

The inventions claimed herein were developed with Government support under contracts DAAD19-03-1-0331 awarded by the U.S. Army RDECOM Acquisition Center, 0310661 awarded by the National Science Foundation, GM072970 awarded by the National Institutes of Health, and HR0011-05-1-0007 awarded by the Defense Advanced Research Projects Agency. The United States Government has certain rights in said claimed inventions.

This work was also supported by grant 59206-N12 of the Austrian Science Fund and grant SNF 200021-112122/1 of the Swiss National Science Foundation.

BACKGROUND

The patent or application file contains at least one drawing executed in color. Copies of this patent or patent application publication with color drawing(s) will be provided by the Office upon request and payment of the necessary fee.

Symmetry is a central concept in many natural and man-made objects and plays an important role in visual perception, design, engineering, and art. Symmetries are often approximate or partial, due to variations in growth processes, imperfections in manufacturing or acquisition procedures, or shortcomings in manual design applications. Several recent efforts in shape analysis have focused on detecting symmetries in two- and three-dimensional shapes. See, for example, J. Podolak et al., *A Planar-Reflective Symmetry Transform for 3D Shapes*, ACM Trans. Graph. 25, 3, 549-559 (2006) (hereinafter "Podolak"); A. Martinet et al., *Accurate Detection of Symmetries in 3D Shapes*, ACM Trans. Graph. 25, 2, 439-464 (2006) (hereinafter "Martinet"); and N. J. Mitra et al., *Partial and Approximate Symmetry Detection for 3D Geometry*, ACM Trans. Graph. 25, 3, 560-568 (2006) (hereinafter "Mitra"). Numerous applications have successfully utilized symmetry information, e.g., for model reduction (see Mitra), scan completion (see S. Thrun et al., *Shape from Symmetry*, Int. Conference on Computer Vision (2005) (hereinafter "Thrun")), segmentation (see P. Simari et al., *Folding Meshes: Hierarchical Mesh Segmentation Based on Planar Symmetry*, Proc. Symposium on Geometry Processing (2006) (hereinafter "Simari")), shape matching, and viewpoint selection (see Podolak).

Related research has mostly been done in the area of symmetry detection for geometric objects. Early papers focused on detecting exact symmetries in 2D and 3D planar point sets, which limits their applicability for more complex geometries. See, for example, M. Atallah, *On Symmetry Detection*, IEEE Trans. on Computers, 663-666 (1985); and J. Wolter et al., *Optimal Algorithms for Symmetry Detection in Two and Three Dimensions*, The Visual Computer, 37-48 (1985). A method for approximate symmetry detection has been proposed by Zabrodsky, defining a symmetry measure for a single given transformation as the distance of a shape to the closest symmetric shape. See H. Zabrodsky et al., *Using Bilateral Symmetry to Improve 3D Reconstruction from Image Sequences*, Computer Vision and Image Understanding: CVIU 67, 1, 48-57 (1997); and H. Zabrodsky et al., *Symmetry as a Continuous Feature*, IEEE Transactions on Pattern Analysis and Machine Intelligence 17, 12, 1154-1166 (1995). Martinet finds global symmetries of 3D objects by analyzing the extreme and spherical harmonic coefficients of generalized moments.

There has also been increasing interest in more general symmetry transforms (see Podolak and references therein). For such general symmetry transforms, the goal is to define a continuous measure for all possible transformations of a certain symmetry class. This enables various applications including shape matching, alignment, segmentation or viewpoint selection. Other techniques that analyze distributions in transformation space include the Random Sample Consensus (RANSAC) method (see, e.g., M. A. Fischler et al., *Random Sample Consensus: A Paradigm for Model Fitting with Applications to Image Analysis and Automated Cartography*, Comm. of the ACM, 381-395 (1981)), as well as geometric hashing techniques that have recently been applied successfully for partial shape matching (see, e.g., H. J. Wolfson et al., *Geometric hashing: An overview*, IEEE Comput. Sci. Eng. 4, 4, 10-21 (1997); and R. Gal et al., *Salient Geometric Features for Partial Shape Matching and Similarity*, ACM TOG 25, 1 (2006)). The medial axis transform captures local reflective symmetries with respect to a point, which can be accumulated to extract more global symmetries. See, for example, H. Blum, *A Transformation for Extracting Descriptors of Shape*, Models for the Perception of Speech and Visual Forms, 362-380 (MIT Press, 1967).

The rather involved computations and the inherent instability of the medial axis transform have prevented a widespread use so far. However, recently proposed stable versions of the medial axis transform may potentially alleviate these problems. For an overview, see D. Attali et al., *Stability and Computation of the Medial Axis—a State-of-the-Art Report*, Mathematical Foundations of Scientific Visualization, Computer Graphics, and Massive Data Exploration (2004). Symmetry has also been exploited to define shape descriptors that represent global reflective and rotational symmetries with respect to a shape's center of mass. See, for example, M. M. Kazhdan et al., *A Reflective Symmetry Descriptor*, ECCV, 642-656 (2002). This approach has been applied successfully for alignment, classification and shape matching. See, for example, M. Kazhdan et al., *Symmetry Descriptors and 3D Shape Matching*, Sympos. on Geometry Processing, 116-125 (2004). More recent work uses symmetry detection for segmentation (see, e.g., Simari), or scan completion (see, e.g., Thrun).

Various symmetrizations are known in classical geometry, e.g. symmetrization of convex sets (see B. Grunbaum, *Measures of Symmetry for Convex Sets*, Proc. Symposium Pure Math. 7,233-270 (1963)), or Steiner symmetrization that maps a subset of Euclidean space to a set of spheres, while preserving volume and convexity (see H. Hadwiger, *Vorlesungen ueber Inhalt, Oberflaeche und Isoperimetrie*, Springer (1957)). Symmetrization methods are also used in function theory (see G. Faber, *Ueber potentialtheorie und konforme abbildung*, Sitzungsber. Bayer. Akad. Wiss. Math.-Naturwiss. Kl., 49-64 (1920)) and tensor algebra (see A. Schouten, *Tensor Analysis for Physicists*. (Cambridge Univ. Press. 1951)). None of the aforementioned approaches proposes a method for symmetrization of general geometric shapes.

SUMMARY

Systems and methods for enhancing symmetry in 2D and 3D objects are disclosed herein. At least some example embodiments include a computer-readable storage medium including software that can be executed on a processor to symmetrize a modeled physical object. The software causes the processor to identify a plurality of clusters (each including a plurality of symmetric point pairs that are each derived from a plurality of sampled surface points of the modeled physical object), and to calculate and apply each of a first plurality of displacement value pairs to corresponding sample positions of each of the plurality of symmetric point pairs within at least one cluster of the plurality of clusters, wherein the symmetry of the at least one cluster is increased. The software further causes the processor to calculate a second plurality of displacement value pairs, to contract the at least one cluster using the second plurality of displacement value pairs, to merge two or more clusters of the plurality of clusters within the transformation space, and to present a graphical representation of the symmetrized modeled physical object to a user.

Other example embodiments include a computer system that symmetrizes modeled physical objects that includes processing logic, memory (coupled to the processing logic) that stores data representing a modeled physical object (the data including a plurality of sampled surface points of the modeled object), a display device (coupled to the processing logic) that presents a graphical representation of the modeled physical object to a user of the computer system, and an input device that accepts input from the user. The processing logic identifies a plurality of clusters (each including a plurality of symmetric point pairs that are each derived from a plurality of sampled surface points of the modeled physical object), and calculates and applies each of a first plurality of displacement value pairs to corresponding sample positions of each of the plurality of symmetric point pairs within at least one cluster of the plurality of clusters, wherein the symmetry of the at least one cluster is increased. The processing logic further calculates a second plurality of displacement value pairs, contracts the at least one cluster using the second plurality of displacement value pairs, merges two or more clusters of the plurality of clusters within the transformation space, and presents a graphical representation of the symmetrized modeled physical object to a user on the display device.

BRIEF DESCRIPTION OF THE DRAWINGS

For a detailed description of at least some example embodiments, reference will now be made to the accompanying drawings in which.

DETAILED DESCRIPTION

Figure 1:
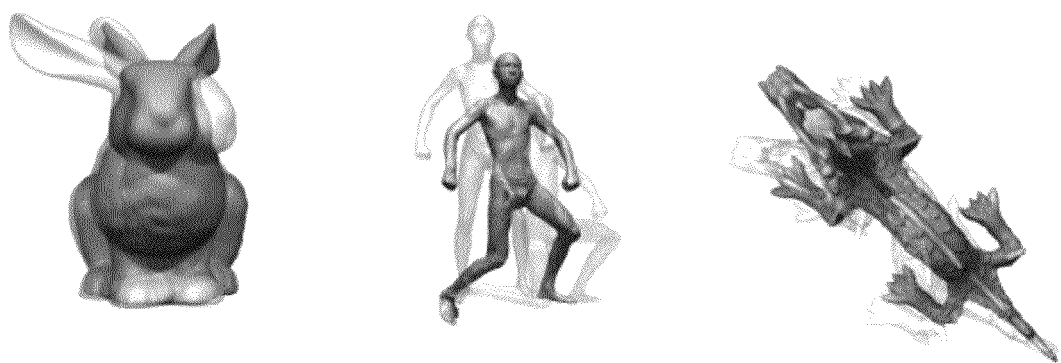
FIG. 1 shows examples of different 3D objects symmetrized with the disclosed algorithm, in accordance with at least some embodiments.

The challenge in symmetrization lies in the fact that simply copying parts of a model and applying the desired symmetry transform does not lead to satisfactory results in general. For example, the global symmetries of the shapes shown in FIG. 1 (where the transparent shapes indicate the original models, and the center example shows a fully automatic correspondence computation that can be formulated as a symmetrization of the two poses of a scanned human) generally cannot be realized with such copying. The present disclosure describes systems and methods for symmetrization that enhance the symmetries in a given model, while reducing undesired alterations of the shape of the models that are introduced by the symmetrization. More specifically, given an explicit pairing of points, a closed-form solution for the optimal reflective and/or rigid transformation can be derived, as well as the corresponding minimal displacements needed to achieve the desired symmetry. The disclosed systems and methods alternate between symmetry detection and shape deformation, using an optimization that couples the spatial domain with the symmetry transformation space (where symmetries are more naturally expressed) to successively enhance symmetries in a given model. The disclosed symmetrization requires no user interaction beyond specifying a few parameters for symmetry detection and shape deformation. The resulting optimization minimally deforms the shape while maximizing its symmetry score using existing shape deformation tools. See, for example, T. Igarashi et al., *As-Rigid-As-Possible Shape Manipulation*, ACM Trans. Graph. 24, 3, 1134-1141 (2005) (hereinafter "Igarashi"); and M. Botsch et al., *Primo: Coupled Prisms for Intuitive Surface Modeling*, Proc. Symposium on Geometry Processing, 11-22 (2006) (hereinafter "Botsch").

Symmetry Detection

A precursor to symmetrization is symmetry detection. While those of ordinary skill in the art will recognize that a number of techniques for symmetry detection may be suitable for use with the symmetrization disclosed herein, at least some of the example embodiments disclosed implement the symmetry detection introduced in Mitra, hereby incorporated by reference. Partial symmetry relations of a shape S can be defined as the invariance of subparts $S_1, S_2 \subset S$ under a certain transformation T such that $T(S_1)=S_2$. Transformations typically include reflections, translations, rotations, or scaling. Such a symmetry transformation induces a point-wise correspondence between $S_1$ and $S_2$, i.e., every point $p \in S_1$ is paired with a symmetric point $T(p) \in S_2$. To find an unknown symmetry transformation T, the aforementioned correspondence is estimated by sampling the model and pairing compatible samples on S. Compatible here means that the local geometry at the two sample points can be matched with a transformation of the specific symmetry class in consideration.

Figure 2:
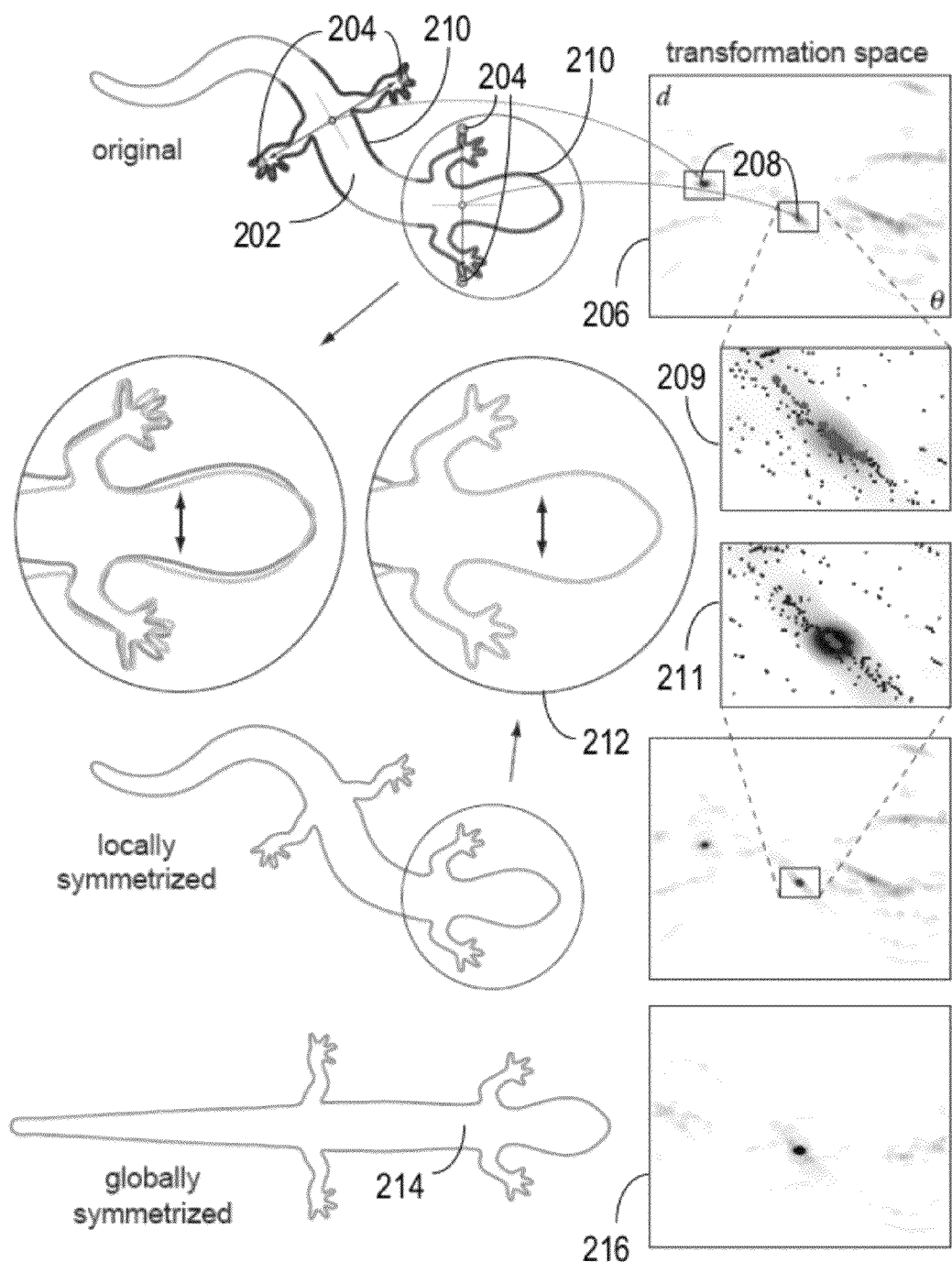
FIG. 2 shows a symmetrization in 2D, in accordance with at least some example embodiments.

FIG. 2 illustrates an approach applicable to reflective symmetries in 2D, in accordance with at least some example embodiments. The original shape 202 is sampled, and compatible sample pairs 204 are mapped into the space of reflective transformations 206 shown on the right as density plots. Correspondences are found by checking the spatial consistency of points within clusters 208, yielding marked regions 210 on the model (and the red points shown in zoomed boxes 209 and 211). After contracting clusters in transformation space, the shape is locally symmetric as shown by the zoomed and overlaid reflected geometry 212. Merging the clusters and further incremental contraction finally yields the globally symmetrized model 214 shown with corresponding transform plot 216 at the bottom.

The boundary curve of the gecko of FIG. 2 is sampled with 577 points, which results in 4780 matching point pairs. Each pair defines a unique reflection line, parametrized by an angle θ and the distance d to the origin, that can be seen as evidence for this specific (local) symmetry relation. By accumulating such evidence in transformation space, more extensive symmetries can be found using spatial clustering methods. Those of ordinary skill in the art will recognize that similar spatial clustering methods have been used to efficiently compute planar reflective symmetry transforms (see, e.g., Podolak). Since a cluster does not necessarily correspond to a connected region in the spatial domain, in at least some example embodiments the symmetric patches are extracted using incremental region growing. This process effectively computes the correspondence between the symmetric patches by discarding points in transformation space, and corresponding point pairs in the spatial domain, that do not belong to spatially connected parts. For the gecko model this yields two clusters that correspond to the red and blue regions shown in the figure.

Figure 3:
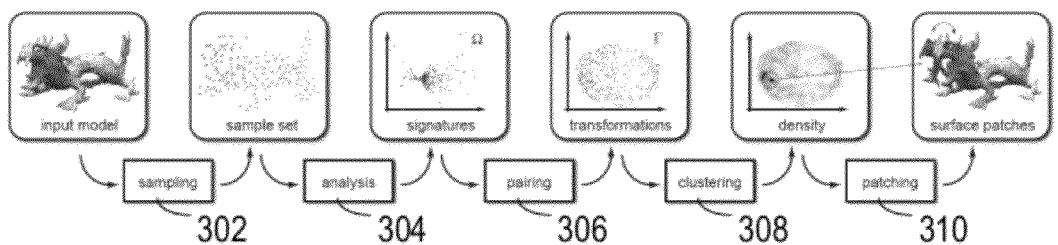
FIG. 3 shows a symmetry extraction pipeline, in accordance with at least some example embodiments.

FIG. 3 gives a high-level overview of this symmetry extraction pipeline. Sampling 302 yields a set P of surface points. For each $p_i \in P$ a local signature is computed by analysis 304. Points $p_i, p_j$ with similar signatures are paired (pairing 306) and a point in transformation space Γ is computed mapping the local frame of $p_i$ to the one at $p_j$. Clustering 308 in Γ yields subsets of P that remain invariant under a certain transformation, which are extracted using spatial region growing (patching 310). What follows is a description of the individual stages and of the approach for detecting symmetries implemented in at least some example embodiments.

Symmetry Detection: Signatures and Transformations

Figure 4:
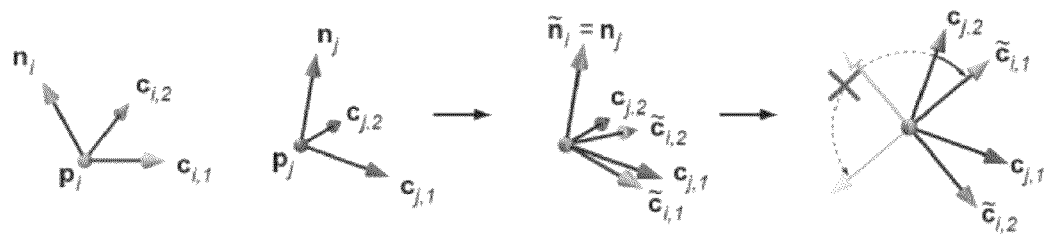
FIG. 4 illustrates how the principal directions define a local frame ($c_{i,1}, c_{i,2}, n_i$), with normal vector $n_i = c_{i,1} \times c_{i,2}$, in accordance with at least some example embodiments.

The Euclidean transformation group generated by translations, rotations, reflections, and uniform scalings is considered in order to identify parts of a given 3D shape that are invariant under transformations in this symmetry group or some lower-dimensional subgroup. To apply this concept, in at least some example embodiments the transformation $T_{ij}$ that maps a point $p_i$ on the surface of the model to another point $p_j$ is computed. While point positions are sufficient for defining a unique plane of reflection as in the example above, all degrees of freedom of a general Euclidean transform cannot be determined from the spatial positions alone. Geometry signatures are therefore computed at each sample point $p_i$ based on the concept of normal cycles. See, for example, D. Cohen-Steiner et al., *Restricted Delaunay Triangulations and Normal Cycle*, Symposium on Computational Geometry, 312-321 (2003) (hereinafter "Cohen-Steiner"). The curvature tensor at $p_i$ within a sphere of radius r is approximated (using, e.g., the algorithm proposed by P. Alliez et al., *Variational Tetrahedral Meshing*, ACM Trans. Graph. 24, 3, 617-625 (2005) (hereinafter "Alliez")), and integrated principal curvatures $\kappa_{i,1} \leq \kappa_{i,2}$ and principal directions $c_{i,1}$ and $c_{i,2}$ are computed. The radius r should be on the order of the local sample spacing to achieve sufficient averaging when computing the curvature tensor and avoid a strong dependence on the specific location of the sample points (see FIG. 4).

The principal directions define a local frame $(c_{i,1}, c_{i,2}, n_i)$, with normal vector $n_i = c_{i,1} \times c_{i,2}$. This frame is oriented as a right-handed coordinate frame that aligns with the outward pointing surface normal by flipping signs of the appropriate vectors if necessary. In order to obtain a canonical rotational component $R_{i,j}$ of the transformation $T_{i,j}$, the two normals are first aligned along their common plane, and then the smaller of the two rotations around the normal that aligns to one of the two possible choices of orientation in tangent space is selected. The uniform scale component of $T_{ij}$ is estimated from the ratio of principal curvatures as $s_{ij} = (\kappa_{i,1} + \kappa_{j,1} + \kappa_{i,2}/\kappa_{j,2})/2$, and the translation is computed as $t_{ij} = p_j - s_{ij} R_{ij} p_i$. For a given pair $(p_i, p_j)$, a point in 7-dimensional transformation space Γ is obtained as $T_{ij} = (s_{ij}, R_{ij}^x, R_{ij}^y, R_{ij}^z, t_{ij}^x, t_{ij}^y, t_{ij}^z)$, where $R_{ij}^x, R_{ij}^y, R_{ij}^z$ are the Euler angles derived from $R_{ij}$ and $t_{ij} = [t_{ij}^x, t_{ij}^y, t_{ij}^z]^T$. In order to handle reflections, the transformation obtained when reflecting the model about an arbitrary but fixed plane is also computed.

Symmetry Detection: Point Pruning

A differential surface patch at umbilic points, i.e., those for which $\kappa_{i,1} = \kappa_{i,2}$, is invariant under rotations around the surface normal. Pairs involving such points and their signatures do not define a unique transformation, but trace out curves in transformation space, which may quickly camouflage meaningful symmetry clusters. To avoid clutter in transformation space, in at least some example embodiments these points from the sample set are discarded, i.e., only points on the surface with distinct principal curvatures (and hence stable principal directions) are considered or "pruned", which gives rise to a unique transformation for each point when paired with another compatible point. Apart from making the symmetry clustering more robust, point pruning has the additional advantage of reducing computation time. The adaptive sample set is obtained by applying a threshold $\gamma<1$ on the ratio of curvatures: $p_i \in P$, if $|\kappa_{i,1}/\kappa_{i,2}|<\gamma$. In at least some example embodiments, $\gamma=0.75$ is used. Nonetheless, those of ordinary skill in the art will recognize that other values of $\gamma$ may be suitable for use within the claimed systems and methods, and all such values of $\gamma$ are contemplated by the present disclosure.

Symmetry Detection: Pairing

Given the reduced (i.e., pruned) set of surface samples P and their signatures, transformations for pairs of points in P can be computed. A random subset $P' \in P$ is selected and all pairs (p',p) with $p' \in P'$ and $p \in P$ that provide evidence for a symmetry relation are identified. Theoretical bounds on the size of P and P' required to successfully find symmetries of a certain size are described in more detail below.

Figure 5:
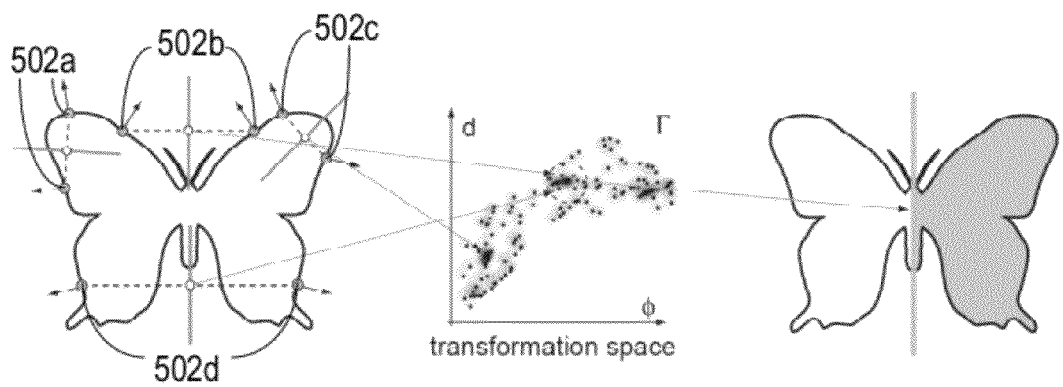
FIG. 5 illustrates symmetry detection for reflections, in accordance with at least some example embodiments.

As indicated above, evidence of a selected point pair for a specific symmetry relation is only reliable if a local surface patch around each point is invariant under a transformation from the considered symmetry group G. In the 2D illustration of FIG. 5, for example, a pair 502 can be rejected if the curvature estimates at both points differ too much, since curvature is invariant under reflection. Every pair of points shown defines a symmetry line l that is described by a distance d and an angle ϕ. Multiple points clustered in a small region in transformation space provide evidence of a symmetry. To obtain an efficient pairing algorithm, in at least some example embodiments all samples to a signature space Ω are mapped, and the metric of that space is used to estimate the deviation from perfect invariance. Only point pairs that are close in Ω are considered as suitable candidates for a local symmetry relation, which avoids an exhaustive computation of a quadratic number of point pairs.

For the full 7-dimensional Euclidean group in 3D, the mapping from P to $\Omega_7 = \mathbb{R}$ is given as $\sigma_7(p_i)=\kappa_{i,1}/\kappa_{i,2}$, since uniform scaling, rotation, and translation leave the ratio of principal curvatures unchanged. The sub-index 7 indicates the dimension of the symmetry group. For purely rigid transforms, $\sigma_6(p_i)=(\kappa_{i,1}, \kappa_{i,2})$ is defined, with $\Omega_6=\mathbb{R}^2$. For a given sample $p_i \in P'$, all suitable partners in P are determined by performing a range query in Ω. Using standard spatial proximity data structures, e.g., a kd-tree, pairing in O(n' log n) time is performed, where n=|P| and n'=|P'|. If only reflections and/or translations are considered, pairs are additionally be rejected based on the orientation of the local frames. In such a case, pair 502a of FIG. 5, for example, would be discarded due to normal inconsistency.

Figure 6:
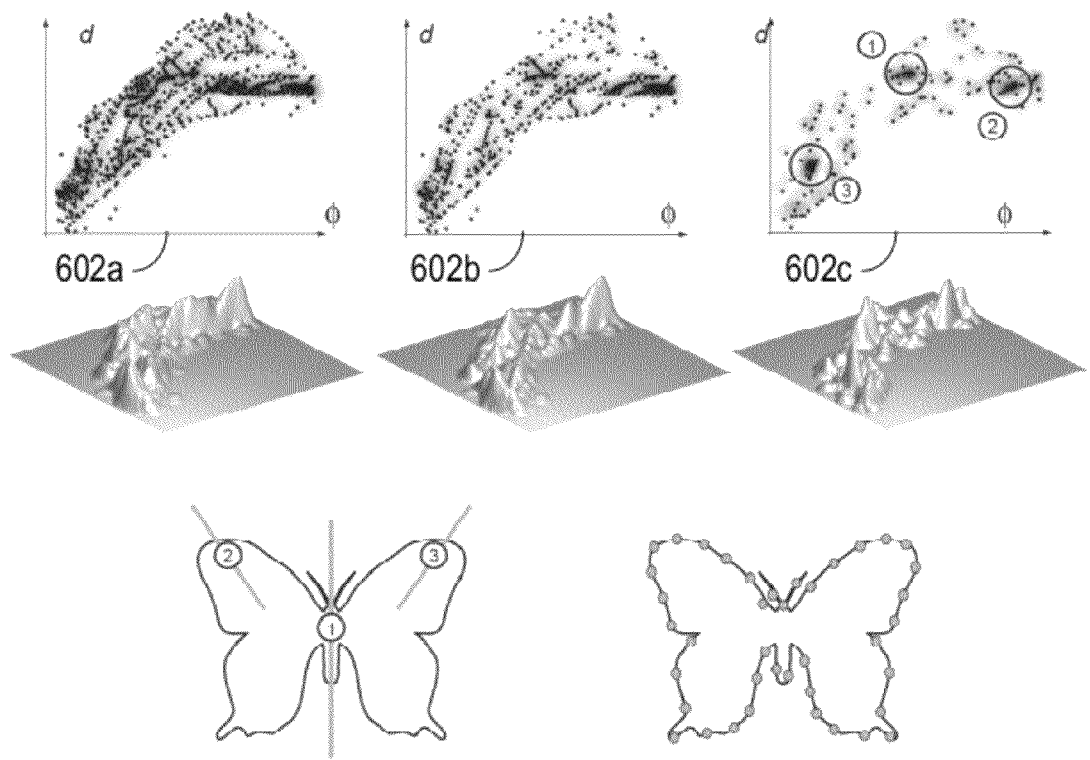
FIG. 6 shows an example of pair pruning, in accordance with at least some embodiments.

FIG. 6 shows that pruning not only reduces the complexity of the clustering algorithm, but also avoids clutter in transformation space. By focusing only on locally consistent symmetry pairs, meaningful clusters are stably detected in Γ. In the example of FIG. 6, 40 samples on the butterfly shown lead to $$\binom{40}{2} = 780$$

points in transformation space. Pruning based on curvature reduces the set to 503 points, while additionally normal-based pruning yields 138 points. Density plots 602 illustrate how meaningful symmetry clusters become significantly more pronounced.

Clustering

The pairing computed in the previous stage provides a set of transformations that map local surface patches onto each other. Each pair thus provides evidence for a symmetry relation at the level of the local sample spacing. To extract meaningful symmetries at larger scales, this local evidence needs to be accumulated, i.e., groups of pairs with a similar transformation that correspond to symmetric subsets of the model surface need to be identified. This requires the definition of a distance metric in Γ, which is non-trivial, since scaling, rotation, and translation need to be combined in a single metric. In at least some example embodiments, the norm of a transformation $T=(s,R_x,R_y,R_z,t_x,t_y,t_z) \in \Gamma$ is defined as the weighted sum $\|T\|^2=\beta_1 s^2+\beta_2(R_x^2+R_y^2+R_z^2)+\beta_3(t_x^2+t_y^2+t_z^2)$ (e.g., by using the approach described in N. M. Amato et al., *Choosing Good Distance Metrics and Local Planners for Probabilistic Roadmap Methods*, IEEE Trans. On Robotics and Automation, 442-447 (2000)). The weights $\beta_i$ allow for adjustment of the relative influence of the individual components of the transformation. In at least some example embodiments, these weights are set so that a rotation by 180 degrees corresponds to a displacement of half the bounding box diagonal and a scaling factor of 10. A metric for Γ is subsequently derived as $d(T, T')=\|T-T'\|$, where the subtraction is component-wise. See also M. Hofer et al., *From Curve Design Algorithms to the Design of Rigid Body Motions*, The Visual Computer, 279-297 (2004) (hereinafter "Hofer") for a detailed discussion.

Clustering: Mean-Shift

Figure 7:
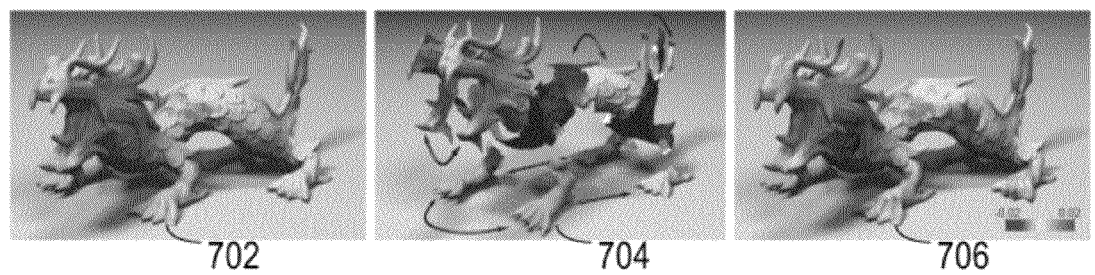
FIG. 7 illustrates symmetry detection on a sculpted model, in accordance with at least some example embodiments.

If the symmetries in the model are perfect (and the sampling includes point pairs that are perfectly symmetric), then all pairs of the same (discrete) symmetry relation map to a single point in Γ. Many real-world objects exhibit approximate symmetries, however, and the sampling will not be precisely symmetric in general. A technique is thus needed for identifying clusters in transformation space. When looking at the distribution of points in Γ, it is apparent that standard parametric clustering methods, such as k-means clustering, are not suitable for such purposes. In general, no a priori knowledge is available regarding the number of (partial) symmetries of the input model, i.e., selecting k can be difficult. Furthermore, clusters are not necessarily isotropic, especially for approximate symmetries like the ones shown, for example, in FIG. 7. From left to right, the figure shows the original model 702, detected partial and approximate symmetries 704, and color-coded deviations from perfect symmetry 706 as a fraction of the bounding box diagonal.

A more suitable clustering method is mean shift clustering, a non-parametric method based on gradient ascent on a density function ρ. See, for example, D. Comaniciu et al., *Mean Shift: A Robust Approach Toward Feature Space Analysis*, IEEE PAMI 24, 603-609 (2002) (hereinafter "Comaniciu"). Mean shift clustering has also been used for skinning mesh animations (see, e.g., D. L. James et al., *Skinning Mesh Animations*, ACM TOG 24, 3, 399-407 (2005)), and for 3D motion estimation (see, e.g., O. Tuzel et al., *Simultaneous Multiple 3D Motion Estimation Via Mode Finding on Lie Groups*, Proceedings of ICCV, vol. 1, 18-25 (2005)).

In at least some example embodiments, the aforementioned density function is defined in Equation (1) as a sum of kernel functions K centered at each point $T_i$ in Γ as $$\rho(T) = \sum_i K(\|T - T_i\|/h). \quad (1)$$

The radially symmetric Epanechnikov kernel with bandwidth h can be used, for example, as suggested in Comaniciu. The significant modes of ρ are determined using gradient ascent. All points that flow into a local maximum of sufficient height are considered samples of a significant cluster $C_k$. The corresponding symmetry transformation $T_k$ is then defined by the cluster's maximum. Thus, the algorithm can be understood as a voting scheme: each point pair votes for the symmetry relation that has been extracted from its local frames. If many votes are cast for the same symmetry, a local peak is created in the accumulated density function. See Comaniciu for more details on mean-shift clustering.

Verification

A significant mode detected by the mean-shift clustering algorithm does not necessarily correspond to a meaningful symmetry. Since the spatial relation of sample points is lost during the mapping to transformation space, sample pairs from uncorrelated parts of the object can accumulate to form discernible clusters. The effectiveness of the claimed systems and methods is based at least in part on the observation that statistically such spurious modes are rare (a more detailed analysis is provided below). It is highly unlikely that many uncorrelated point pairs agree on the same transformation, i.e., are mapped to the same point in 7D transformation space. Thus, a spatial verification can be performed for each cluster $C_k$ by extracting the connected components of the model that are invariant under the corresponding transformation $T_k$. In at least some example embodiments, these surface patches are computed using an incremental patch growing process, starting with a random point of $C_k$, which corresponds to a pair $(p_i,p_j)$ of points on the model surface. The one-ring neighbors of $p_i$ may then be examined, $T_k$ applied, and the distance of the transformed points to the surface around $p_j$ tested to determine if it is below a given error threshold. If so, the pair $(p_i,p_j)$ of points is added to the current patch. The patch continues to be extended along its boundary until no more points can be added. During the growth process, all visited samples on the surface are marked, and points in $C_k$ that correspond to these samples are removed. This process is then repeated using the next point in $C_k$ until all points have been considered.

Since the transformation $T_k$ at the cluster's maximum does not necessarily provide the best possible transformation for matching the surface patches, in at least some example embodiments $T_k$ is incrementally refined as the patch grows using an iterated closest points (ICP) algorithm. See, for example, S. Rusinkiewicz et al., *Efficient Variants of the ICP Algorithm,* 3DIM, 145-152 (2001). The normalized residual of the ICP matching then provides a quantitative measure for the exactness of the symmetry. See, for example, N. J. Mitra et al., *Registration of Point Cloud Data from a Geometric Optimization Perspective*, Symposium on Geometry Processing, 23-32 (2004). Other measures, such as the Hausdorff distance can also be used. The result is a collection of pairs of patches on the model surface that are mapped onto each other by the cluster's transformation $T_k$. This information can be encoded in a weighted graph, wherein each node corresponds to a patch, and each edge denotes the transformation that maps two patches onto each other, weighted by the matching error.

Once the Euclidean symmetries (exact and/or approximate) have been detected, the next step is to perform the symmetrization, i.e., to identify a deformation that enhances approximate symmetries present in a given shape. The deviation from perfect symmetry can be observed as variance of the clusters in transformation space, as illustrated by the red cluster in zoomed box 209 of FIG. 2. In at least some example embodiments, the shape is defined in such a way that the extracted clusters are contracted, while altering the shape as little as possible. As shown in FIG. 2, contracting clusters symmetrizes the shape locally, but fails to recognize more complex global transformations, such as the reflective symmetry along the curved spine of the gecko. In at least some example embodiments, the different clusters are subsequently merged in transformation space, yielding a global deformation that unbends the spine. This symmetrization is formulated as an optimization that is based on optimal displacement vectors for which closed-form solutions are derived, as described in more detail below.

Optimal Displacements

Figure 8:
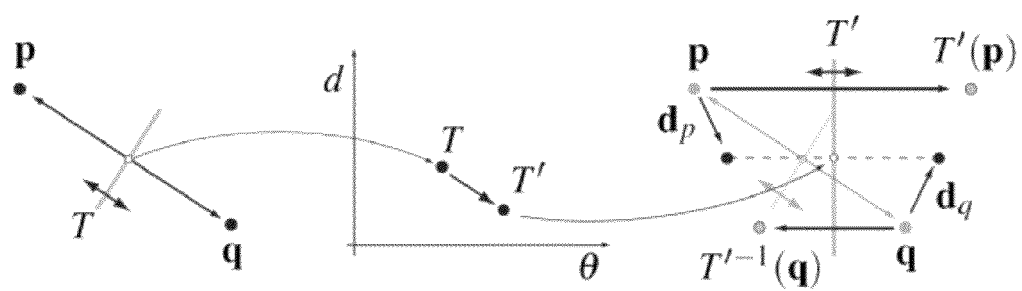
FIG. 8 shows optimal displacements $d_p$ and $d_q$ for a point pair (p,q) when changing the transformation from T to T', in accordance with at least some example embodiments.

The symmetrization performed by at least some example embodiments identifies the minimal deformation that achieves perfect symmetry. For this purpose, a coupling between transformation space and the spatial domain is defined that specifies how pairs of points are displaced when their corresponding local symmetry mappings are modified. In one example, two points p and q are given that define a unique reflective transformation T that maps p to q=T(p) (see FIG. 8). T is represented by the line through (p+q)/2 with normal direction p−q and can be expressed as a point T=(θ,d) in a 2D transformation space, where θ is the angle with some fixed reference line, and d denotes the distance to the origin. If the transformation T is moved to T'=(θ',d') the points p and q need to be displaced by some vectors $d_p$, and $d_q$ such that $T'(p+d_p)=q+d_q$. For purposes of minimizing the effect on the shape of the model of this local change of the transformation, the displacements with the smallest magnitude are of interest, i.e. the displacements that minimize $\|d_p\|^2+\|d_q\|^2$. Simple geometric considerations show that these optimal displacements are given by Equation (2) as $$d_p = \frac{T'^{-1}(q) - p}{2} \text{ and } d_q = \frac{T'(p) - q}{2}, \quad (2)$$

effectively moving each point halfway to its perfectly symmetric counterpart, and thus evenly splitting the displacements. This relation also holds for other mappings, such as rigid transformations. Displacing a point T to T' in transformation space thus induces these minimal displacements of the corresponding sample points in the spatial domain.

Given the single pair displacements, closed-form solutions are derived for the optimal symmetrizing transformation of a given set of corresponding point pairs. For the 2D example with reflective symmetry shown in FIG. 9, a given set of point pairs $\{(p_1,q_1), \ldots, (p_m,q_m)\}$ on the boundary of a shape is assumed. Correspondences are indicated in the figure using different colors, e.g., the transformation of the yellow sample pair is indicated by the yellow dot in transformation space. Gray dots on the right show the original positions. In at least some example embodiments, the optimal reflective symmetry transform T and corresponding displacements are identified that make the point set symmetric with respect to T, and the transformation T needed to minimize the symmetry cost is as shown in Equation (3):

$$E = \sum_{i=1}^{m} (\|d_{p_i}\|^2 + \|d_{q_i}\|^2) = 2\sum_{i=1}^{m} \|d_{p_i}\|^2. \quad (3)$$

Figure 9:
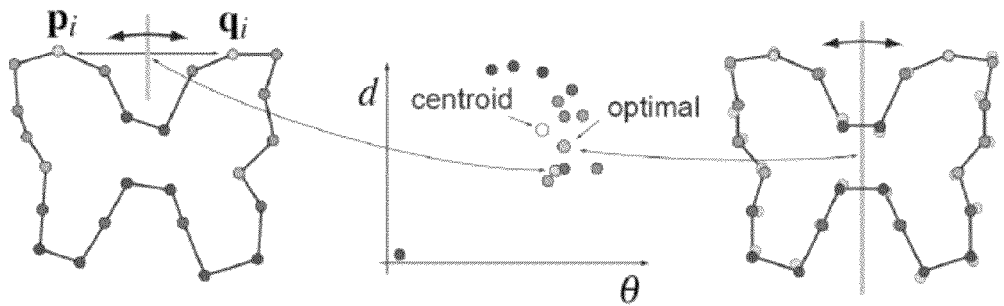
FIG. 9 shows optimal reflection plane and displacements for a set of corresponding point pairs, in accordance with at least some example embodiments.

As shown in more detail below, the problem of minimizing the symmetry cost can be reduced to a 3×3 eigenvalue problem, where the eigenvector with smallest corresponding eigenvalue equals the normal of the symmetry plane, as shown in more detail below. Given the optimal transformation T, the minimal displacements are then computed using Equation (2). Similarly, a closed-form relation for rigid transformations is derived below, which computes the parameters of the transformation using singular value decomposition. In the example of FIG. 9, this optimal transformation ($E_{opt}$=69.4) differs from the centroid of the pair transformations ($E_{cen}$=142.6).

Optimization

The optimal displacements derived above form the basis of the symmetrization of at least some of the example embodiments described herein. In general these displacements cannot be applied directly to symmetrize the shape. There are two reasons for this: 1) the initial random sampling of the model does not respect symmetries; and 2) the correspondences estimated during the symmetry detection stage are potentially inaccurate and incomplete. Sample points on the surface might not be paired and will thus not be displaced, leading to incorrect results. As described below, these issues are addressed in at least some of the example embodiments described herein, which operate to locally optimize the sample points on the surface, and to subsequently perform an optimization that continuously deforms the shape to maximize its symmetries.

Optimization: Optimizing Sample Positions

The example embodiment of FIG. 2 illustrates that the extracted symmetry clusters exhibit variance in the distribution of a cluster's points in transformation space. Two different factors contribute to this variance: 1) geometric deviations from perfect symmetry lead to variations in the transformations defined by each sample pair; and 2) even if the geometry is perfectly symmetric, the samples generated on the model typically do not respect this symmetry exactly, leading to additional variance.

Figure 10:
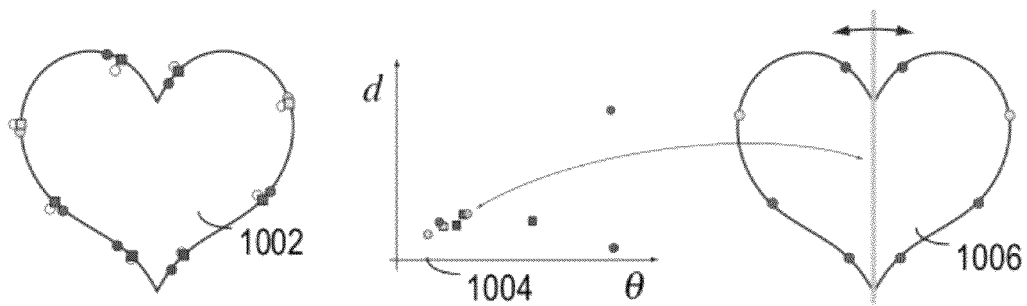
FIG. 10 illustrates optimizing sampling positions, in accordance with at least some example embodiments.

In at least some example embodiments, deformations of the shape are triggered by geometric deviations from symmetry, not by non-symmetric sample placement. Therefore, sample points on the surface of the model are first perturbed to optimize the sampling positions with respect to a cluster's symmetry transform. Every sample p ∈ S is shifted in the direction of its optimal displacement $d_p$. Since this may move samples off the surface, the samples are projected back onto the surface and the optimal transformation and displacements vectors are recomputed. The sample movement is restricted to a sphere with radius equal to the local sample spacing to avoid excessive drifting. This sequence is iterated until the variance of the cluster is no longer reduced, or alternatively until a threshold value is reached (e.g., a variance of less than 1%, or 10 iterations). Thus, samples glide along the surface to positions where the symmetry score is maximized. This reduces the variance of a cluster without modifying the geometry and thus leads to smaller subsequent deformations, as shown in the example of FIG. 10. Colored dots on left image 1002 show the original positions of matching pairs, white dots indicate the displaced positions and colored squares show the samples after re-projection. The corresponding transformations are shown in center graph 1004. The samples in right image 1006 show the result after five iterations. For the perfectly symmetric shape shown, all transformations are contracted to a single point, i.e., on the right all samples are symmetric with respect to the same reflection line, shown in yellow.

Optimization: Symmetrizing Deformation

The deformation required for symmetrization can be formulated as an optimization where the displacement vectors are considered as directions of locally steepest descent pulling the shape towards the desired symmetry. Since each point pair is considered independently, a coupling between neighboring points on the surface of the model is needed to obtain a coherent surface deformation. This regularization can be achieved using existing shape deformation techniques that can incorporate the symmetrizing displacements as either positional constraints or forces acting on the shape. In order to achieve detail-preserving deformation, shape features should be rotated correctly to avoid unnatural shearing effects that could destroy symmetries. In addition, a quantitative measure of the magnitude of the deformation is needed, e.g., in the form of a deformation energy, which enables the example embodiments described herein to favor symmetrizing deformations that involve the least change of shape.

Figure 11:
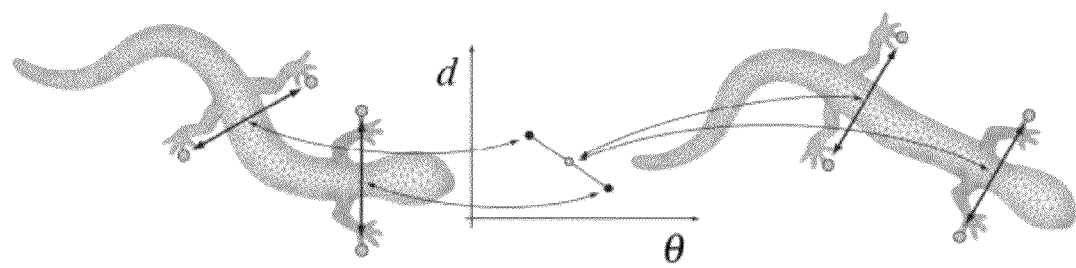
FIG. 11 illustrates as-rigid-as-possible shape deformation with interior meshing, in accordance with at least some example embodiments.

For 2D models, in at least some example embodiments, an as-rigid-as-possible shape manipulation technique is used as shown in FIG. 11 (see, e.g., Igarashi). In this example, the shape is deformed by moving only two points in transformation space to their centroid. The corresponding surface samples are displaced according to Equation (2) and used as constraints for the 2D deformation method. The interior meshing required by this approach is computed in a manner similar to that presented in Alliez. For 3D shapes, in at least some example embodiments, the non-linear PriMo deformation model of Botsch is used, which is based on a simplified thinshell model and has shown to provide intuitive detail preservation. However, other shape deformation techniques can also be applied, as long as they satisfy the above requirements. See, for example, M. Pauly et al., *Example-Based 3D Scan Completion*, Symposium on Geometry Processing, 23-32 (2005).

Contracting clusters. The symmetry detection algorithm of Mitra provides sample pairs $\{(p_i,q_i)\}$ on the initial model S corresponding to points $\{T_i\}$ of a cluster in transformation space. In at least some example embodiments, sample positions on S are first optimized as previously described. The optimal transformation are subsequently computed, and the resulting displacements $p_i \rightarrow p_i + \Delta t d_{p_i}$ are applied (analogously for $q_i$), where $\Delta t$ is the time step of the optimization. A value of $\Delta t$=0.1 is used for the example embodiments described herein, though other suitable time steps are contemplated by the present disclosure. The new sample locations are used as positional constraints when evaluating the deformation model to obtain a deformed shape S'. Sample positions are then re-positioned on S', new optimal displacement vectors are computed, and the sequence is iterated. Since deforming the shape can also affect the point pair matching, in at least some example embodiments the symmetry detection stage is frequently re-applied to update correspondences. For the examples presented below, re-computing the pairing every 5 time steps is sufficient, which avoids unnecessary computational overhead by exploiting the temporal coherence of the pair correspondences.

Figure 12:
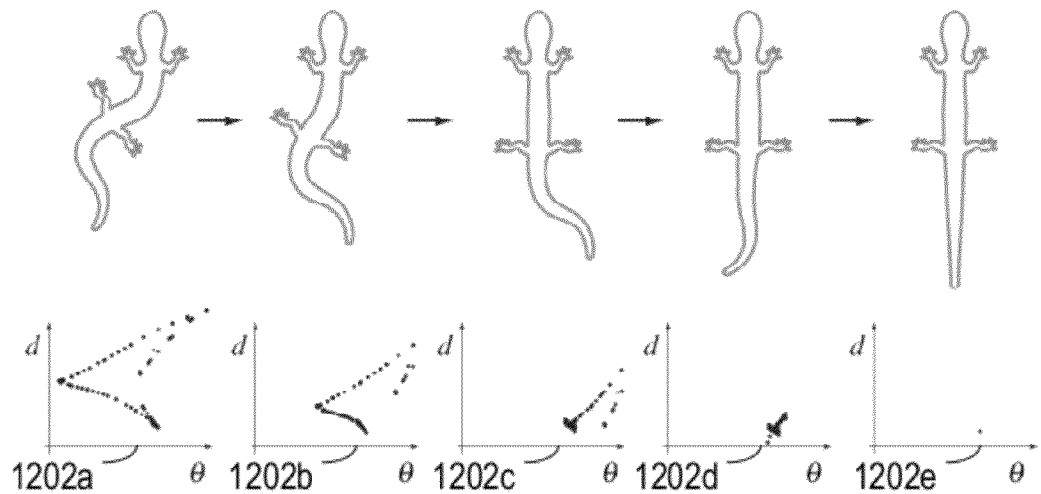
FIG. 12 illustrates symmetrizing deformation, in accordance with at least some example embodiments.
Figure 13:
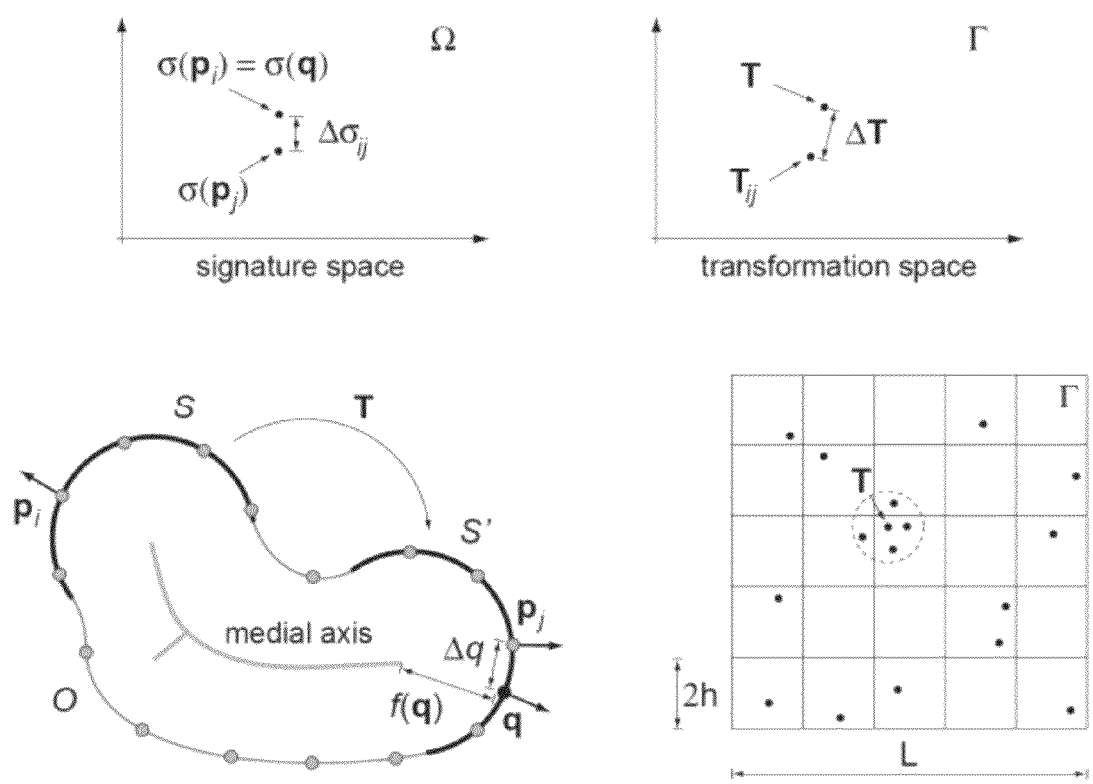
FIG. 13 illustrates the theoretical analysis providing probabilistic bounds on the sampling requirements of the symmetry detection method, in accordance with at least some example embodiments.

Merging clusters. The symmetrization of at least some of the example embodiments described herein requires reliable correspondences that are extracted from sufficiently pronounced clusters in transformation space. When contracting such a cluster as described above, the regularization of the deformation model causes adjacent points that are not part of the cluster to move with the constrained samples to minimize the deformation energy. This shifts the transformations of these sample pairs towards the cluster. FIG. 12 shows this behavior for the gecko model (see also FIG. 2). The transform plots 1202 of FIG. 12 illustrate the paths taken by all pairs of the final contracted cluster. Not all of these points are initially part of a cluster, but get continuously attracted to the cluster due to the regularization of the deformation. If the separation of clusters is more distinct, however, the automatic contraction can fail to recognize certain global symmetries. An example can be seen in FIG. 13, where the two distinct clusters correspond to the approximative reflective symmetries of the bunny model's head and body of FIG. 1. Contracting each cluster individually will not produce a deformation strong enough to rotate the head into the globally symmetric position. Therefore, in at least some example embodiments, neighboring clusters are merged after contraction by defining additional displacements that attract clusters to each other. Two clusters at T and T' are merged by moving all cluster points to their common centroid. The transform plots on the left are projected from 6D to 2D for visualization (see also FIG. 11; moving two points in transformation space to their centroid induces the deformation shown on the right of the figure).

In at least some example embodiments, clusters are first sorted by height and the most pronounced cluster is selected for symmetrization. The symmetrizing deformations are applied until the deformation energy indicates that the deviations from the original shape have exceeded a certain threshold. The process is then repeated with the next biggest cluster until all clusters of a suitable size have been symmetrized. Finally, clusters are greedily merged based on their distance in transformation space.

Control. Apart from the aforementioned threshold parameters, two additional techniques to control the optimization are provided. 1) In the deformation model the displaced positions are treated as soft constraints, i.e., the symmetrizing displacements are not met exactly in general. This allows the user to control the deformation by modifying the stiffness of the shape's material. Soft materials will allow for better symmetrization at the cost of potentially greater deviation from the rest shape, while stiffer materials more strongly resist the symmetrizing deformations to retain the original shape. Since both deformation models provided in at least some example embodiments allow spatially varying stiffness, the user has flexible control over the behavior of the shape. 2) In addition to the stiffness parameter, a simple interface allows the user to control the symmetrization by interactively selecting clusters for contraction or merging. For example, in at least some embodiments the user can mark or tag some points in a rough cluster to indicate which corresponding parts of an object are to be symmetrized. Such a user interface can be useful when a certain semantic meaning is associated with a symmetry that is not recognized automatically.

Optimal Transformations

Reflection. An expression is derived for the optimal reflection T that makes a set of point pairs $(p_1,q_1), \ldots, (p_m,q_m)$ symmetric with respect to T such that $q_i=T(p_i) \forall i$. As shown in Equation (4), optimal here means that the displacements are minimal, i.e., $$E_T = \sum_i (\|d_{p_i}\|^2 + \|d_{q_i}\|^2) = 2\sum_i \|d_{p_i}\|^2 = \sum_i \|(T(q_i) - p_i)\|^2/2, \quad (4)$$

is minimized. If the reflection plane T is represented by its normal n and distance d from origin, then for any point p, $T(p)=p+2(d-n^T p)n$. Thus, as shown in Equation (5), $$E_T = \sum_i \|q_i + 2(d - n^T q_i)n - p_i\|^2 / 2. \quad (5)$$

Equation (5) is solved for the normal n and d that, in at least some example embodiments, minimizes $E_T$, subject to the constraint $n^T n=1$. Analogizing to standard least squares fitting, it follows that $E_T$ is minimized by the smallest eigenvector $n^*$ of the matrix $(A-bb^T/2m)$, where $A=\Sigma_i(p_iq_i^T+q_ip_i^T)$ and $b=\Sigma_i(p_i+q_i)$. The corresponding distance of the plane from the origin is given by $d^*=n^{*T} b/2m$.

Rigid Transform. Similarly, in at least some example embodiments, an optimal rigid transformation is derived for a given set of point pairs $(p_1,q_1), \ldots, (p_m,q_m)$. Let $C_p=[e_p^1 e_p^2 e_p^3]$ be the local coordinate frame of p consisting of the surface normal, and the two principal curvature directions, respectively. The objective is to make the point pairs symmetric with respect to some rigid transform composed of a rotation R followed by a translation t, i.e. $q_i=Rp_i+t$ and $RC_{p_i}=C_{q_i}$ $\forall i$. The cost of the corresponding minimal displacement of points and, as shown in Equation (6), alignment of the coordinate frames is proportional to $$E_{(R,t)} = \sum_i (\|Rp_i + t - q_i\|^2 + \lambda \|RC_{p_i} - C_{q_i}\|_F^2), \quad (6)$$

where $\lambda$ is a positive constant weighting the two error components, and $\|.\|_F$ denotes matrix Frobenius norm. See, for example, Hofer. The objective is to find the optimal rigid transform $(R^*,t^*)$ which minimizes $E_{(R,t)}$. Setting $\partial E_{(R,t)}/\partial t=0$, results in $R\bar{p}+t=\bar{q}$, where $\bar{p}=\Sigma_i p_i/m$ and $\bar{q}=\Sigma_i q_i/m$. Using $\tilde{p}_i=p_i-\bar{p}$ and $\tilde{q}_i=q_i-\bar{q}$, results in Equations (7) through (9), $$E_{(R,t)} = \sum_i (\|R\tilde{p}_i - \tilde{q}_i\|^2 + \lambda \|RC_{p_i} - C_{q_i}\|_F^2) \quad (7)$$

$$= \sum_i \|R\tilde{p}_i - \tilde{q}_i\|^2 + \sum_i \sum_{j=1}^3 \|\sqrt{\lambda}(Re_{p_i}^j - e_{q_i}^j)\|^2 \quad (8)$$

$$= \sum_{k=1}^{4m} \|Ru_k - v_k\|^2, \quad (9)$$

where suitable $u_k$ and $v_k$ are used to simplify notation. This reduces the problem of finding the rotation that best aligns a set of point pairs for which a closed form solution exists. See, for example, D. W. Eggert et al., *Estimating 3-D Rigid Body Transformations: A Comparison of Four Major Algorithms*. Mach. Vision Appl., vol. 9(5-6), 272-290 (1997). Using this result, $E_{(R,t)}$ is minimized as follows: Let $H=\Sigma_{k=1}^{4m} u_k v_k^T$: and $H=U\Lambda V^T$ its singular value decomposition. The optimal rotation is then given by $R^*=VU^T$ and the corresponding optimal translation vector is $t^*=\bar{q}-R^*\bar{p}$.

Theoretical Bounds on Symmetry Detection Sampling Requirements

In at least some example embodiments, probabilistic bounds on the sampling requirements of the symmetry detection algorithm are defined. More specifically, conditions on the sample set P, as well as the number n'=|P'| with $P' \in P$ of random samples required to find a symmetry of a certain size with high probability, are defined.

Suppose a smooth manifold surface O with a symmetric patch S ⊂ O and a partial symmetry transformation T ∈ Γ is given, such that S'=T(S) ⊂ O. For conciseness of the exposition, the derivations to the group of rigid transformation are restricted, i.e., uniform scaling is ignored. P={$p_1, \ldots, p_n$} is assumed to be an ∈-sampling of the surface O, i.e., for every point x ∈ O there exists a sample p ∈ P such that |$p_i$−x|<∈f(x), where f(x) denotes the local feature size at x, i.e., the smallest distance of x to the medial axis of O. See, for example, N. Amenta et al., *Surface Reconstruction by Voronoi Filtering*, Symposium on Computational Geometry, 39-48 (1998) (hereinafter "Amenta").

For a given sample $p_i$ ∈ ∠S, let q ∈ S' be the symmetric point of $p_i$ on the surface, i.e., q=T($p_i$). In general, this point will not be part of the sample set, i.e., q ∉ P. However, it can be shown that there exists a point $p_j$ ∈ P such that $p_j$=$T_{i,j}$($p_i$) and ||ΔT||=||T−$T_{i,j}$|| is small (see FIG. 13).

Let $F_q$=[$n_q$, $c_{q,1}$, $c_{q,2}$] denote the local frame at q spanned by the normal and the principal curvature directions. Then the transform mapping $p_i$→q can be expressed as a rotation R=$F_q F_{p_i}^{-1}$ followed by a translation t=q−R$p_i$. Since P is an ∈-sampling of O, ∃$p_j$ ∈ P such that |$p_j$−q|<∈f(q). Using results from Amenta and Cohen-Steiner, it follows that if ∈<0.08, ||$F_q$−$F_{p_j}$||≦$c_1$∈ where $c_1$ is a constant depending on the radius of the ball used for estimating the curvature tensor. Let $T_{ij}$=(R',t') denote the transform mapping $p_i$→$p_j$. Using the previous relations and the triangle inequality, Equation (10) shows that $$\|\Delta T\|^2 = \|R-R'\|^2 + \beta\|t-t'\|^2 \leq c_2^2 \epsilon^2, \quad (10)$$

where $c_2$ is a constant depending on $c_1$, β and the diameter of O.

Due to the stability of local signatures on a smooth surface (see, e.g., S. Manay et al., Integral invariant signatures, Proceedings of ECCV, 87-99 (2004)), a small Δσ can be chosen so that Δ$σ_{i,j}$=||$σ_{p_i}$−$σ_{p_j}$||<Δσ when |$p_j$−q|<∈f(q). In other words, the signatures of $p_i$ and $p_j$ are sufficiently similar for the previously described pairing algorithm to group these points and compute their transformation $T_{i,j}$ as a sample point in transformation space Γ. At the same time this transformation is close to the unknown transformation T. Thus, $T_{i,j}$ provides reliable evidence for the symmetry relation that is sought.

Choosing a clustering radius h larger than $c_2$∈, it follows that for any point $p_i$ ∈ S, the symmetry detection algorithm will deposit at least one point in Γ within distance h of T. If m is the number of points in P∩S, then for any random sample from P, a vote within h of T with probability p=m/n results.

Using the Chernoff bound (see, e.g., R. Motwani et al., *Randomized Algorithms*, Cambridge University Press (1995)), it can be shown that if n' points are independently and randomly chosen from P, then with probability greater than 1−α there will be at least k points within h of T in Γ, where, as shown in Equation (11), $$k = (1-\sqrt{2\log\alpha/n'p})n'p, \quad (11)$$

and α ∈ (0,1). Previously, it had been shown that there is a high probability that a cluster of height at least k that includes the transformation T will appear in Γ. To complete the analysis, it is necessary to ensure that this cluster is in fact a pronounced local maximum of the transformation density function and will thus be successfully retrieved by the mean-shift clustering algorithm. This assertion is proven by using a counting argument on Γ partitioned into a set of bins.

Suppose the average number of neighbors in Ω for a query radius of Δσ is μ. Then n' random samples results in roughly M=μn' points in Γ. Let the maximum extent along any dimension in Γ be L. So partitioning Γ using a grid of size 2h results in N=(L/2h)$^d$ bins, where d represents the dimension of Γ. It is clear that if there are more than k points within h of T, at least one bin of Γ will contain at least k/$2^d$ samples. Assuming that point pairs that are not related by any meaningful symmetry relation map to a random bin in Γ, the above-described scenario becomes identical to M balls being independently and uniformly thrown into N urns. It is known that the maximum number of balls in any urn with high probability is given, as shown in Equation (12), by $$E(n',\mu,\Delta\sigma) = \log N/\log(N\log N/M) \quad (12)$$

(see, e.g., G. Gonnet, *Expected Length of the Longest Probe Sequence in Hash Code Searching*, Journal of the Association for Computing Machinery, 289-304 (1981)).

In order for the bin corresponding to T to stand above the noise level, n' is selected such that the following inequality (Equation (13)) holds:

$$E(n',\mu,\Delta\sigma) < (1-\sqrt{2\log\alpha/n'p})n'p/2^d. \quad (13)$$

Thus if a bin in Γ is marked as interesting only if its height is more than k/2d then: (1) with probability 1−α a bin corresponding to the desired transformation T is correctly marked, and (2) only a few bins corresponding to spurious transforms are falsely marked. These outlier bins are easily pruned away in the previously described verification.

Figure 14:
FIG. 14 shows an example of a transformation using a model of Chambord castle, in accordance with at least some example embodiments.
Figure 14:
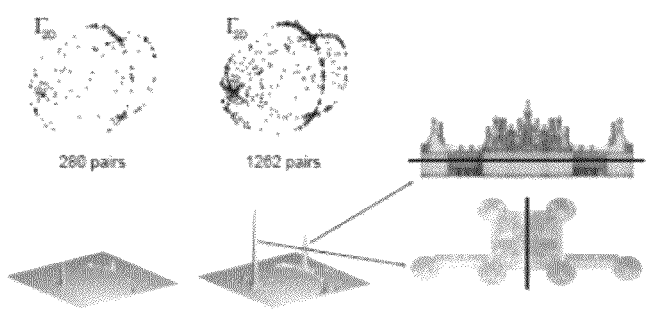
Figure 14:
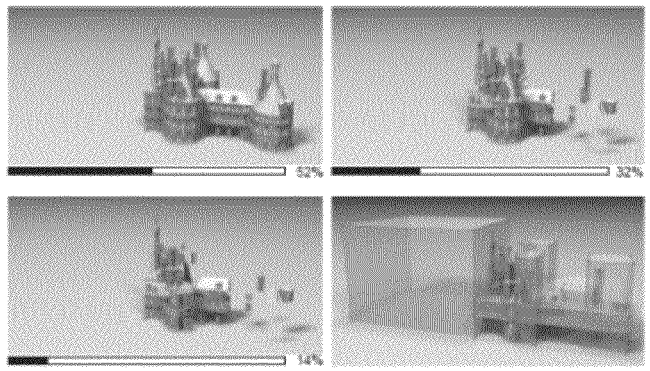
Figure 14:

Requiring an ∈-sampling with ∈<0.08 for P is a fairly severe restriction. While algorithms exists for computing such a point set for a given smooth surface (see, e.g., J. D. Boissonnat et al., *Provably Good Surface Sampling and Approximation*, Symposium on Geometry Processing, 9-18 (2003)), the sampling density would be prohibitively high. As commented in Amenta, empirical evidence suggests that these bounds are quite conservative. In practice, the existing symmetries have been found using a much less restricted sampling. Consider the example of FIG. 14, which shows a) an input model with random surface samples drawn from a total of 2254 samples; b) points in transformation space projected to 2D and associated density plots; the symmetries corresponding to the biggest two modes are shown on the right; c) successive reduction by taking out symmetric patches and resulting bounding box hierarchy; and d) advanced editing using the extracted symmetry relations. In this example, d=6, L/h≈20, and μ=10. Assuming that the initial point set P satisfies the sampling requirements stated above (which is clearly not the case since the surface is not even smooth), then Equation (13) prescribes n'≈300 to detect a global symmetries where p=0.5 with probability more than 95%. Nonetheless, it has been found that even with only 100 samples the global reflective symmetry of the castle can be reliably detected (see FIG. 14). It should be noted that as the size of the symmetric patch becomes smaller, i.e., p decreases, Equation (13) suggests higher values for n'. It should also be noted that while the above-described analysis has been restricted to perfect symmetries, the analysis can be extended to approximate symmetries by increasing h and thereby decreasing the number of bins N.

Symmetrization Examples

FIGS. 15 through 19 illustrate the application of the systems and methods described in the present disclosure on a variety of different shapes. In these examples, the symmetry group of reflections, rotations, and translations are considered, i.e., a 6D transformation space. While the computations associated with these examples are performed in the full 6D space, the visualizations show 2D projections computed using multi-dimensional scaling. See, for example, T. Cox et al., *Multidimensional Scaling*, Chapman and Hall, London (1994). The circular structures noticeable in some of the density plots are artifacts of this projection. All shapes have been symmetrized fully automatically using a fixed global stiffness in the PriMo deformation model.

Figure 15:
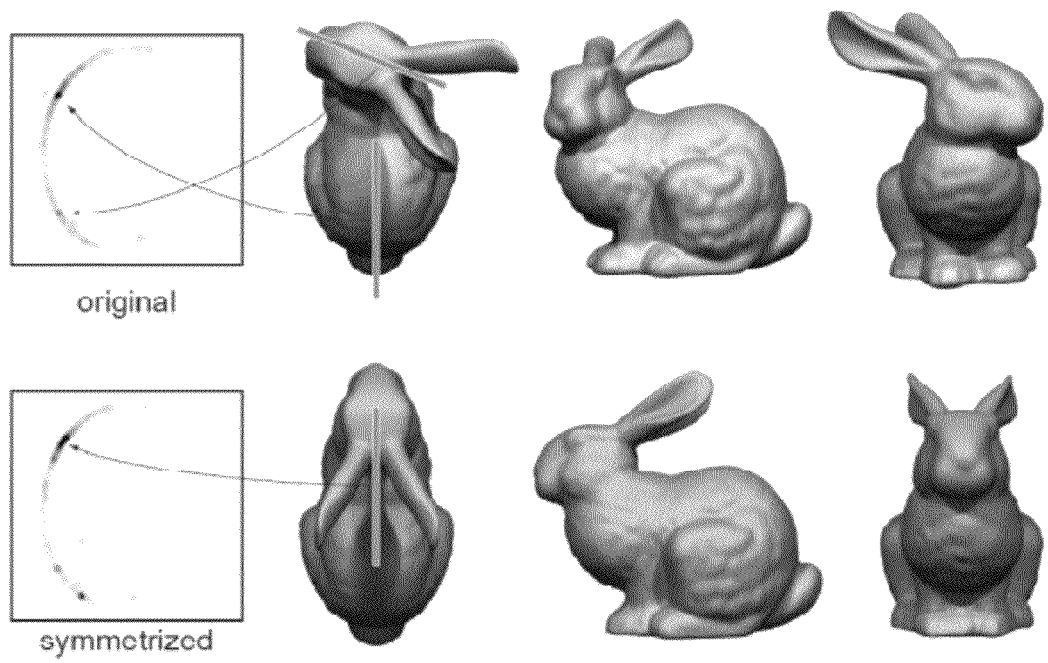
FIG. 15 shows 6D to 2D projection transform plots for an example wherein the Stanford University bunny is symmetrized, in accordance with at least some example embodiments.

Symmetrization of the Stanford University bunny is shown in FIG. 15. The head is rotated by merging the two dominant clusters. Prior contraction of these clusters leads to more subtle changes noticeable in the fur, the ears and the hind legs.

Figure 16:
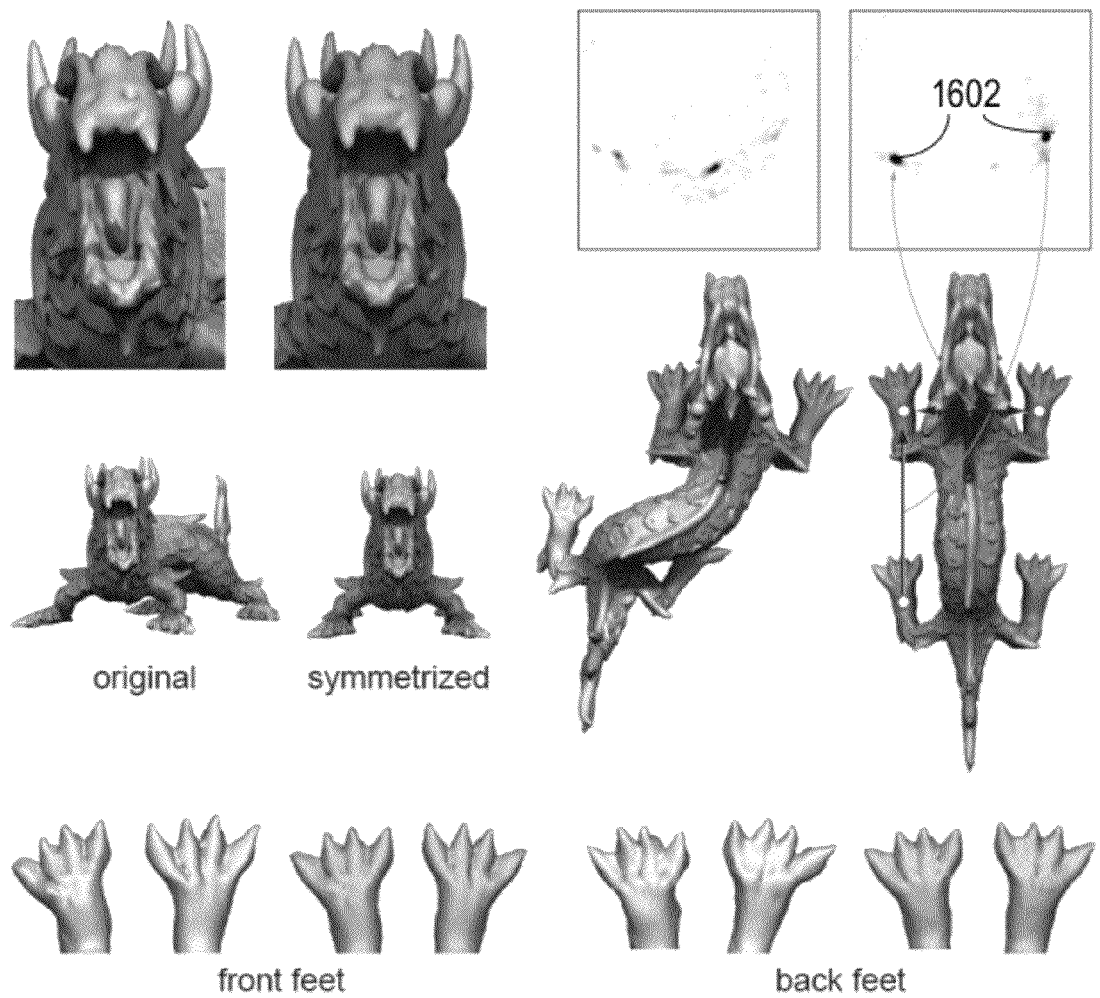
FIG. 16 shows both global and local symmetrization of a sculpted model, in accordance with at least some example embodiments.

FIG. 16 shows the symmetrization of a scanned hand-sculpted statue with many approximate symmetries. At least some example embodiments successfully symmetrize the feet, head and tail of the dragon using cluster contraction and achieve a global reflective symmetry using cluster merging. The two main clusters 1602 in the final transform plot correspond to the global reflective symmetry across the spine and the partial translational symmetry that matches the front and back feet.

Figure 17:
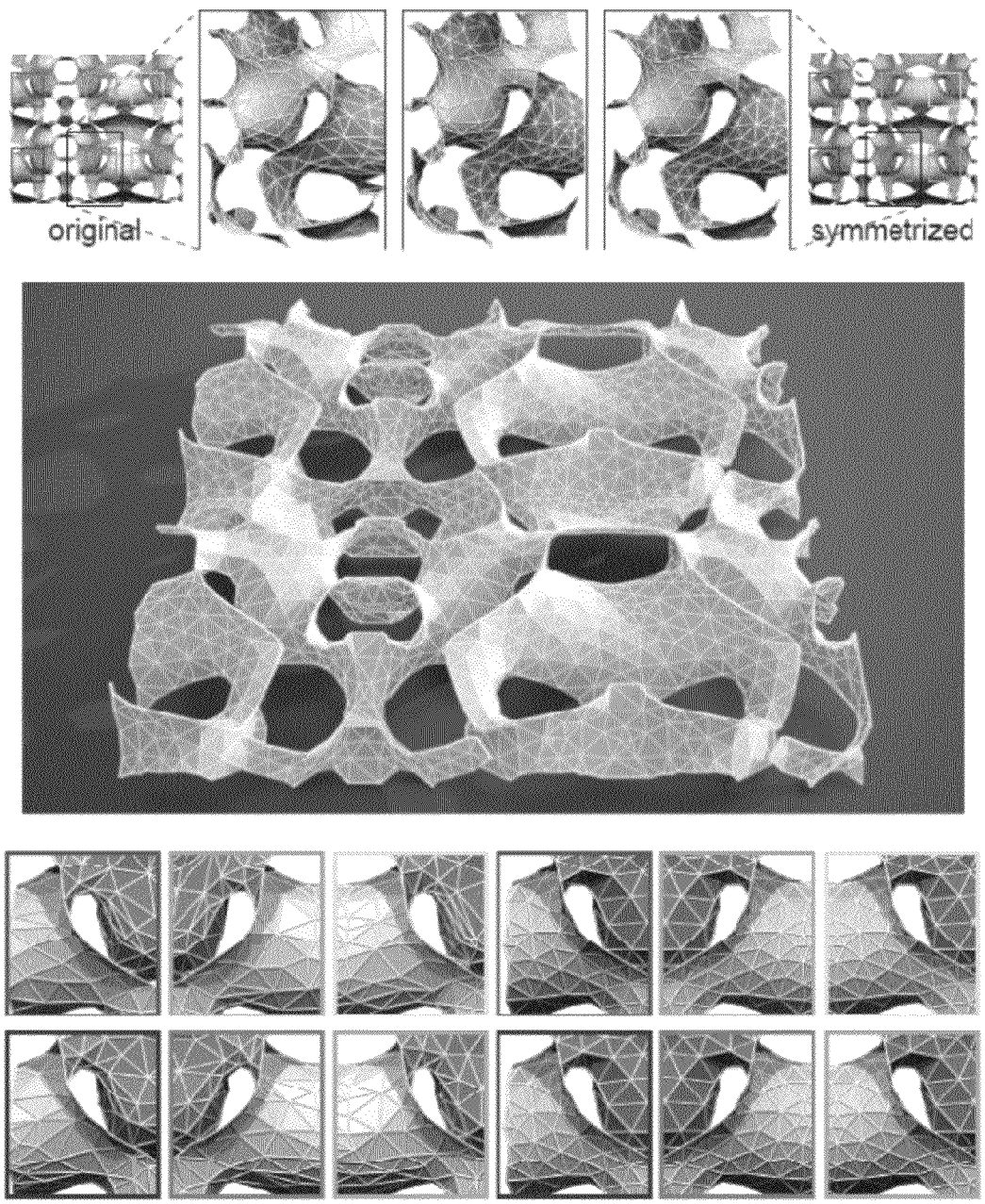
FIG. 17 illustrates how the meshing of the extracted symmetric element evolves during an optimization, in accordance with at least some example embodiments.
Figure 18:
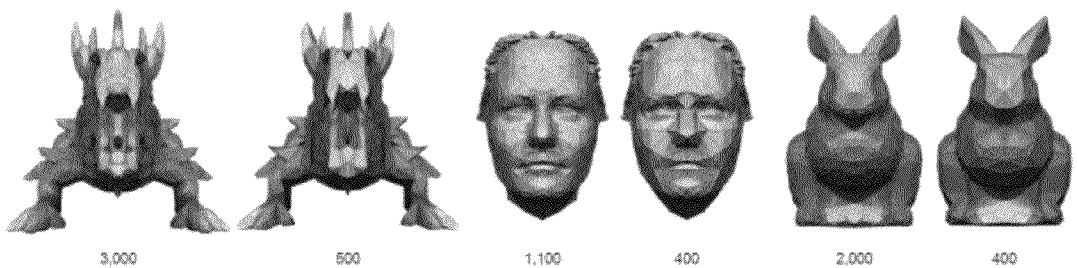
FIG. 18 illustrates obtaining perfectly symmetric meshes using symmetrizing deformations, symmetric sampling, and symmetry-aware meshing, in accordance with at least some example embodiments.

The design study of FIG. 17 contains many repetitive, partially symmetric elements. The extracted symmetric element that evolves during the optimization appears six times in different locations and orientations, as illustrated in the bottom row of the figure. This example illustrates how the previously described symmetry-aware sampling of at least some example embodiments can be used to also symmetrize the discretization of the model, which is important in certain areas such as CAD or architectural design. Similarly, FIG. 18 shows remeshed versions of the bunny, dragon, and face models. The number below each model indicates the corresponding vertex count. After symmetrization of the geometry and placement of symmetric samples, the mesh connectivity of these samples is inferred from the connectivity of the original model. Different resolution levels can be obtained by adapting iterative simplification methods based on edge contraction, such that edges coupled by a symmetry relation are always contracted together. See, for example, M. Garland et al., *Surface Simplification Using Quadric Error Metrics*, SIGGRAPH '97, 209-216 (1997). These perfectly symmetric meshes can be beneficial for compression and efficient rendering, as the inherent redundancy is explicitly represented in the mesh. Similarly, physical simulations can better preserve the symmetries of the underlying dynamics, since these symmetries are matched by the discretization.

Figure 19:
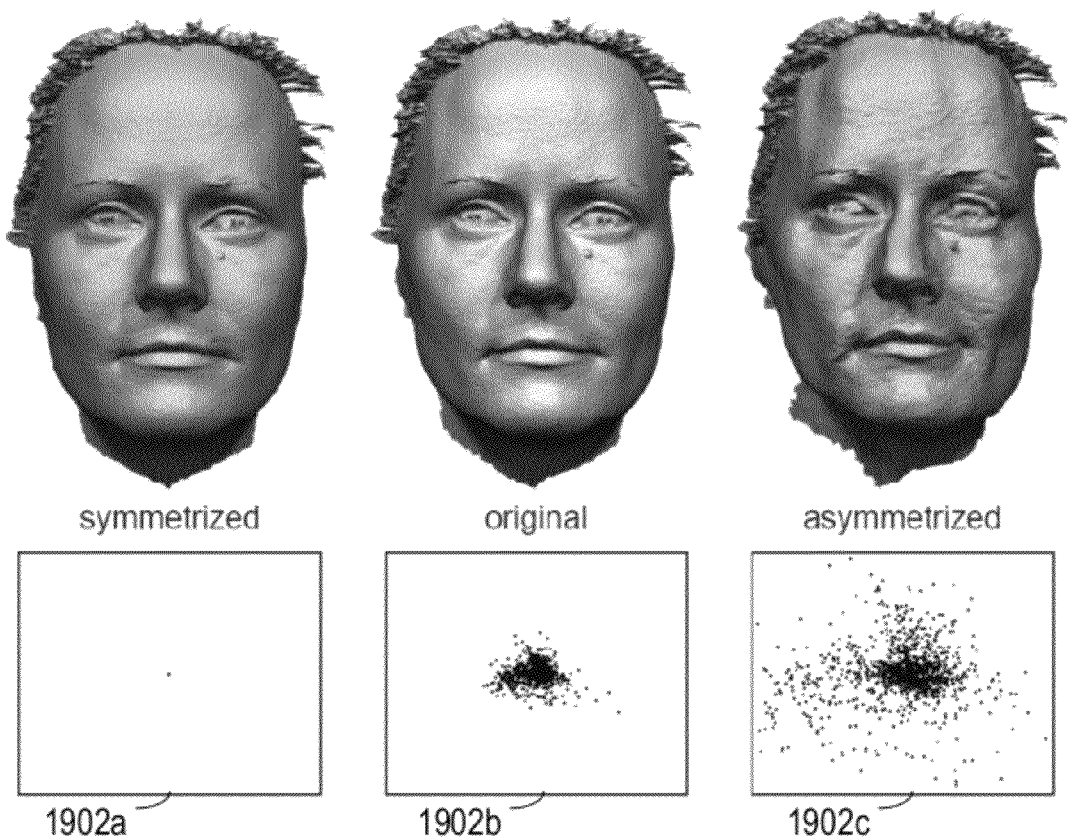
FIG. 19 shows the transform plots illustrating the transformations of consistent corresponding pairs of the dominant cluster for both symmetrization and its inverse operation, in accordance with at least some example embodiments.

FIG. 19 shows the inverse of a symmetrizing deformation, i.e., asymmetries are amplified by moving points along the negative direction of optimal displacement. The original face scan has been symmetrized using cluster contraction. The inverse operation creates a certain enhancement effect that can bring out distinctive characteristics of a face. The transform plots 1902 show transformations of consistent corresponding pairs of the dominant cluster. It should also be noted that the aforementioned inverse operation amplifies high-frequency noise, which is reduced in the symmetrized version.

Figure 20:
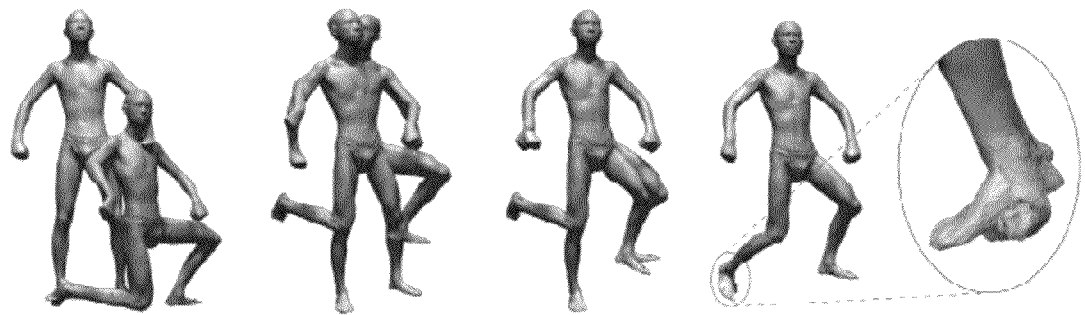
FIG. 20 shows different stages of a fully automatic correspondence computation, in accordance with at least some example embodiments.

FIG. 20 shows an example where point-wise correspondences between two different poses of a scanned human are computed. The two poses are deformed towards each other by successively contracting and merging the most prominent clusters. Contracting and merging clusters effectively fuses different local symmetries into more global ones, thus extending the types of symmetries that can be detected in a given shape. Sample pairs are restricted to always contain one sample from each model, i.e. each point in transformation space describes a local mapping from one shape to the other. Significant clusters thus define approximately rigid subparts of the shape that can then be contracted and merged to warp the two models towards each other. Regions that have already been matched are not considered in subsequent symmetry detection stages, which allows successively smaller clusters to be recognized by the symmetrization. It should be noted that these computations are fully automatic, i.e., no markers, manual pre-alignment or other user interaction is necessary. Table 1 (below) shows the accumulated total time in seconds for symmetry detection, cluster contraction and merging, measured on an Intel dual-core 2.4 GHz with 2 GB RAM.

TABLE 1

| Model | # Triangles | Detection | Contraction | Merging |
|---|---|---|---|---|
| Bunny | 70,550 | 8.43 | 7.38 | 10.63 |
| Dragon | 64,378 | 36.03 | 22.57 | 34.66 |
| Human | 24,998 | 7.64 | 1.91 | 105.95 |
| Face | 34,889 | 4.48 | 3.58 | — |
| Design | 3,380 | 4.12* | 2.56 | — |

*includes time for remeshing

FIGS. 15 and 20 show two cases where the entire model was not processed correctly. The front feet of the bunny and the right foot of the male character did not get symmetrized properly. The reason in both cases is insufficient local matching. The curvature-based pairing did not find corresponding points in these regions due to significant differences in local geometry. Small-scale features are sometimes ignored for similar reasons, e.g., the eye-brows in FIG. 19. A possible solution is the use of multi-scale descriptors for point pair matching. See, for example, M. Pauly et al., *Multi-Scale Feature Extraction on Point-Sampled Models*, Proceedings of Eurographics, 281-289 (2003); and T. Funkhouser et al., *Partial Matching Of 3D Shapes With Priority-Driven Search*, Symposium on Geometry Processing, 131-142 (2006). This can potentially improve the robustness of the point pairing during symmetry detection. In its current form, the correspondence computation illustrated in FIG. 20 is applicable for shapes that contain substantial rigid components. As such it can be used for registration of articulated bodies, but in at least some cases may not be suitable for computing correspondence for general models, e.g. in order to perform complex morphing operations. In at least some embodiments, the deformation model does not respect the semantics of the shape. In particular, for certain shapes it might not be appropriate to merge cluster that are close in transformation space, because they do not belong to the same semantic symmetry. Such cases need to be disambiguated by the user. However, no such user intervention would be required for any of the examples shown and described herein.

Applications

Symmetrization has numerous applications. In shape design, imperfect input data often does not exhibit the symmetries intended by the designer or those present in some ideal model. Examples include shapes modeled using sketch-based interfaces or data stemming from 3D model acquisition. Manually correcting symmetry deficits in the data is time-consuming, cumbersome, and virtually impossible for large-scale models. This problem is even more challenging for articulated or deformable models, where the full shape symmetry is only apparent in certain poses. Similarly, reverse engineering applications can benefit from a symmetrized model to recover the semantic structure of a given shape. Machine recognition of parts can be improved by first applying symmetrization to repetitive elements in an acquired shape. This process can also lead to reduced noise and better compression performance. Certain classes of non-rigid shapes, e.g. articulated models, can be symmetrized to improve the performance of shape matching systems and methods, which can be beneficial for pose-independent model retrieval. More generally, a symmetrized object exhibits a structure that is easier for human beings to perceive, to classify, and to understand.

Computer-Based Embodiments

Figure 21A:
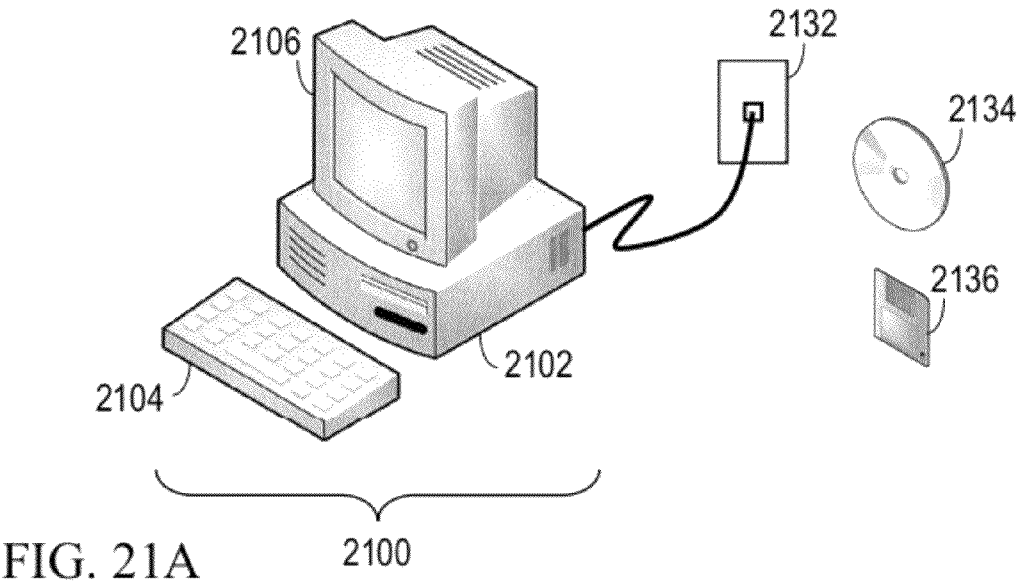
FIG. 21A shows an example of a computer system suitable for performing the disclosed symmetrization, in accordance with at least some embodiments.
Figure 21B:
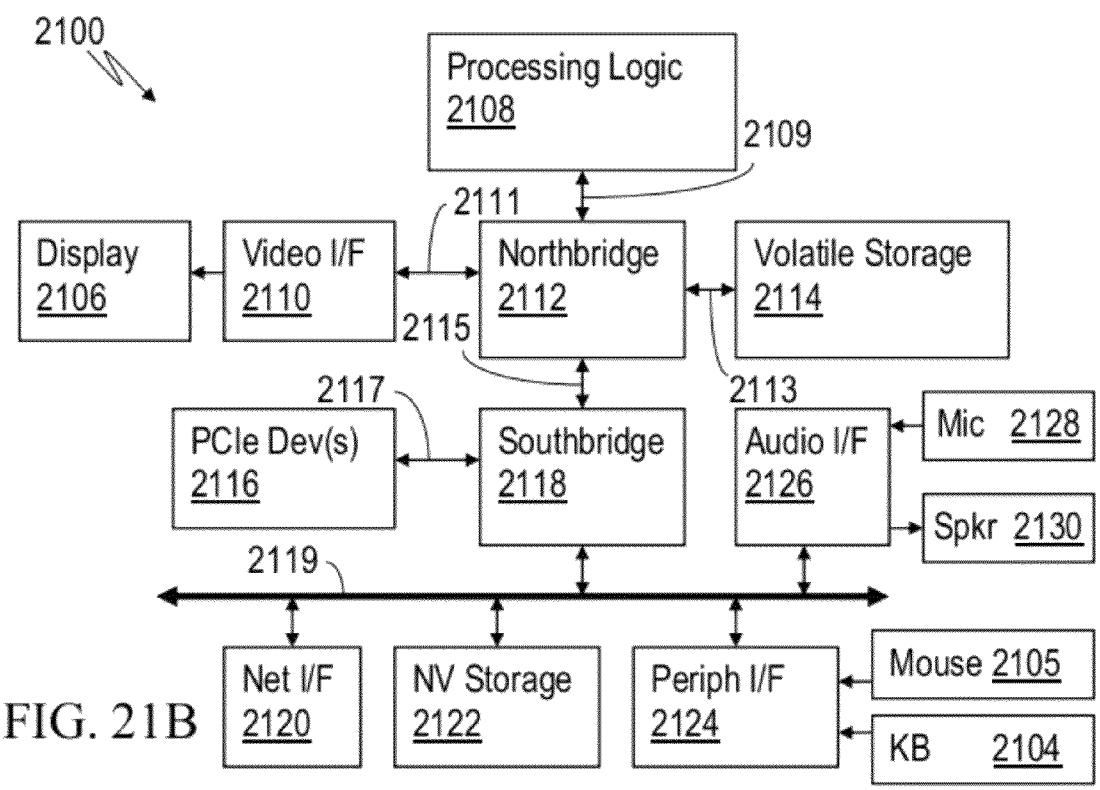
FIG. 21B shows a block diagram of the computer system of FIG. 2A, in accordance with at least some embodiments.

Those of ordinary skill in the art will recognize that the symmetrization described in the present disclosure is well suited to embodiments implemented in software that executes on any of a wide variety of computer systems. FIGS. 21A and 21B show an example of such a computer system, in accordance with at least some embodiments. As shown, the computer system 2100 includes a system unit 2102, a keyboard 2104 and a display 2106. System unit 2102 encloses processing logic 2108, volatile storage 2114 and non-volatile storage (NV Storage) 2122. Processing logic 2108 may be implemented in hardware (e.g., as one or more microprocessors that each may include one or more processor cores), in software (e.g., microcode), or as a combination of hardware and software. Volatile storage 2114 may include a computer-readable storage medium such as random access memory (RAM). Non-volatile storage 2122 may include a computer-readable medium such as flash RAM, read-only memory (ROM), electrically erasable programmable ROM (EEPROM), a hard disk, a floppy disk, (e.g., floppy disk 2136), a compact disk ROM (i.e., CD-ROM, e.g., CD 2134), and combinations thereof.

The computer-readable storage media of both volatile storage 2114 and non-volatile storage 2122 each includes software that may be executed by processing logic 2108, and which provides computer system 2100 with some or all of the functionality described in the present disclosure. Computer system 2100 also includes a network interface, (Net I/F) 2120, which enables computer system 2100 to transmit and receive information via a local area network and/or a wired or wireless wide area network, represented in FIG. 21A by Ethernet jack 2132. Alternatively, network interface 2120 may be a wireless interface (not shown), instead of the wired interface shown if FIG. 21A. Video interface (Video I/F) 2110 couples to display 2106, and audio interface (Audio IF) 2126 couples to microphone (Mic) 2128 and Speaker (Spkr) 2130. A user interacts with computer system 2100 via keyboard (KB) 2104 and mouse 2105 (or alternatively, any similar data entry and/or pointing device), which each couples to peripheral interface (Periph I/F) 2124. Display 2106, together with keyboard 2104 and/or mouse 2105, operate together to provide the user interface hardware of computer system 2100. Microphone 2128 and speaker 2130 may also be incorporated into the user interface.

Computer system 2100 may be a bus-based computer, with a variety of busses interconnecting the various elements shown in FIG. 21B through a series of hubs and/or bridges, including Northbridge 2112 (sometimes referred to as a memory hub controller (MCH) or an integrated memory controller (IMC)) and Southbridge 2118 (sometimes referred to as an I/O Controller Hub (ICH) or a Platform Controller Hub (PCH)). The busses of the example of FIG. 21B include: front-side bus 2109 coupling processing logic 2108 to Northbridge 2112; graphics bus 2111 (e.g., an accelerated graphics port (AGP) bus or a peripheral component interface (PCI) express x16 bus) coupling video interface 2110 to Northbridge 2112; PCI bus 2119 coupling network interface 2120, non-volatile storage 2122, peripheral interface 2124, audio interface 2126 and Southbridge 2118 to each other; PCI express (PCIe) bus 2117 coupling one or more PCI express devices (PCIe Dev(s)) 2116 to Southbridge 2118; bridge interconnect bus 2115 (e.g., an Intel® Direct Media Interface (DMI)) coupling Northbridge 2112 and Southbridge 2118 to each other; and memory bus 2113 coupling Northbridge 2112 to volatile storage 2114.

Peripheral interface 2124 accepts signals from keyboard 2104 and/or mouse 2105 and transforms the signals into a form suitable for communication on PCI bus 2119. Audio interface 2126 similarly accepts signals from microphone 2128 and transforms the signals into a form suitable for communication on PCI bus 2119. Audio interface 2126 also accepts signals from PCI bus 2119 and transforms the signals into a form suitable for speaker 2130. Video interface 2110 (e.g., a PCIe graphics adapter) accepts signals from graphics bus 2111 and transforms the signals into a form suitable for display 2106. Processing logic 2108 gathers information from other system elements, including input data from peripheral interface 2124, and program instructions and other data from non-volatile storage 2122 and volatile storage 2114, or from other systems (e.g., a server used to store and distribute copies of executable code) coupled to a local or wide area network via network interface 2120. Processing logic 2108 executes the program instructions (e.g., software implementing the symmetrization described herein), and processes the data accordingly. The program instructions may further configure processing logic 2108 to send data to other system elements, such as information presented to the user via video interface 2110 and display 2106 or via audio interface 2126 and speaker 2130. Network interface 2120 enables processing logic 2108 to communicate with other systems via a network (e.g., the Internet). Volatile storage 2114 may operate as a low-latency repository of information for processing logic 2108, while non-volatile storage 2122 may operate as a long-term (but higher latency) repository of information (e.g., for storage of data used to represent models such as those shown in FIG. 1).

Processing logic 2108, and hence computer system 2100 as a whole, operates in accordance with one or more programs stored on non-volatile storage 2122 or received via network interface 2120. Processing logic 2108 may copy portions of the programs into volatile storage 2114 for faster access, and may switch between programs or carry out additional programs in response to user actuation of keyboard 2104 and/or mouse 2105. The additional programs may also be retrieved from non-volatile storage 2122, or may be retrieved or received from other locations via network interface 2120. One or more of these programs execute on computer system 2100, causing the computer system to perform at least some of the functions described herein.

Although the embodiments described include software executing on individual, self contained physical computers, software that implements the functionality described herein is not limited to such physical computers. Those of ordinary skill in the art will recognize that other implementations of a computer system may be suitable for executing software that implements at least some of the functionality herein. These may include virtualized computer systems (e.g., systems implemented using VMWare Workstation software by VMware®), and distributed computer systems (e.g., diskless workstations and netbooks), just to name a few examples. All such implementations and variations of a computer system are contemplated by the present disclosure.

The above discussion is meant to illustrate the principles of at least some embodiments. Other variations and modifications will become apparent to those of ordinary skill in the art once the above disclosure is fully appreciated. For example, other alternative embodiments can include the use of perceptual error measure. Maximum symmetrization with minimum perceptual change may provide improved compression performance for symmetry-based compression algorithms, such as fractal compression. Also, although at least some of the example embodiments described herein focus on enhancing symmetries in a given model, other operations in transformation space are conceivable, as illustrated in FIG. 19. Such filters may result in useful operations in the spatial domain that might be difficult to achieve otherwise. Still other embodiments can include the imposition of the symmetries of one object on another object. The use of symmetrization for symmetry-aware segmentation, shape matching, and database retrieval is also contemplated by the present disclosure. It is intended that the following claims be interpreted to include all such variations and modifications.

What is claimed is:

1. A non-transitory computer-readable storage medium comprising software that can be executed on a processor to symmetrize a modeled physical object by causing the processor to:
   identify a plurality of clusters, each comprising a plurality of symmetric point pairs that are each derived from a plurality of sampled surface points of the modeled physical object;
   calculate and apply each of a first plurality of displacement value pairs to corresponding sample positions of each of the plurality of symmetric point pairs within at least one cluster of the plurality of clusters, wherein the symmetry of the at least one cluster is increased;
   calculate a second plurality of displacement value pairs and contract the at least one cluster using the second plurality of displacement value pairs;
   merge two or more clusters of the plurality of clusters within the transformation space; and
   present a graphical representation of the symmetrized modeled physical object to a user.

2. The non-transitory computer-readable storage medium of claim 1, wherein the software causes the processor to identify the plurality of clusters by further causing the processor to:
   calculate a signature value for each of the plurality of sampled surface point pairs;
   include within the plurality of symmetric point pairs those sampled surface point pairs with a signature value below a signature threshold value;
   map each of the plurality of symmetric point pairs to a corresponding point in the transformation space;
   calculate a density value at each transformation space point, each density value being based upon a plurality of transformation space distance metrics between the transformation space point at which the density value is calculated and each of the remaining transformation space points;
   identify one or more density local maximums that exceed a density threshold value;
   define a cluster of the plurality of clusters for each of the one or more identified density local maximums; and
   include within each of the plurality of clusters those transformation space points that flow into an associated identified density local maximum of the one or more identified density local maximums.

3. The non-transitory computer-readable storage medium of claim 1, wherein the software causes the processor to apply each of the first plurality of displacement value pairs by further causing the processor to:
   displace each of the points of the plurality of symmetric point pairs in the direction of a corresponding displacement value of the first plurality of displacement values;
   project each of the symmetric point pairs that are displaced off of the modeled physical object back onto said object; and
   repeat said displacement and projection until a threshold condition is satisfied.

4. The non-transitory computer-readable storage medium of claim 1, wherein the software causes the processor to contract the at least one cluster by further causing the processor to:
   scale each of the second plurality of displacement values;
   calculate new locations for each of the plurality of symmetric point pairs by applying a corresponding scaled displacement value to each point of the plurality of symmetric point pairs within the at least one cluster;
   apply a deformation model to the modeled physical object to generate a modified shape, using the new symmetric point pair locations as positional constraints on the deformation model;
   reposition the plurality of symmetric points onto the modified shape; and
   recalculate the second plurality of displacement values and repeat said scaling, new position calculation, deformation model application and symmetric point re-positioning, using said recalculated displacement values, until a threshold condition is satisfied.

5. The non-transitory computer-readable storage medium of claim 1, wherein the software further causes the processor to contract at least two clusters of the plurality of clusters in descending transformation space point density order as determined by a point density local maximum corresponding to each of said at least two clusters.

6. The non-transitory computer-readable storage medium of claim 1, wherein the software further causes the processor to greedily merge the two or more clusters based on the distance between clusters in the transformation space.

7. The non-transitory computer-readable storage medium of claim 1, wherein the software further causes the processor to merge at least two neighboring clusters of the two or more clusters by moving the points included within said neighboring clusters to a common centroid in the transformation space.

8. The non-transitory computer-readable storage medium of claim 1, wherein the software causes the processor to calculate the first and second plurality of displacement value pairs by further causing the processor to:
   select a transformation function T that produces displacement value pairs that minimize the symmetry cost of the displacements relative to other displacement value pairs;
   wherein p and q are one of the plurality of symmetric point pairs $(p_1, q_1), \ldots, (p_m, q_m)$; and
   wherein the symmetry cost is defined as, $$E = \sum_{i=1}^{m} (\|d_{p_i}\|^2 + \|d_{q_i}\|^2) = 2\sum_{i=1}^{m} \|d_{p_i}\|^2,$$

where, $$d_p = \frac{T^{-1}(q) - p}{2} \text{ and } d_q = \frac{T(p) - q}{2}.$$

9. The non-transitory computer-readable storage medium of claim 8, wherein the software causes the processor to minimize the symmetry cost of the displacements relative to other displacement value pairs by further causing the processor to:
determine the smallest eigenvector n* of the matrix $(A-bb^T/2m)$, where
$A=\Sigma_i(p_iq_i^T+q_ip_i^T)$, $b=\Sigma_i(p_iq_i)$, and the corresponding distance of the plane of reflection from the origin is given by $d^*=n^{*T}b/2m$;
wherein the transformation function T comprises a reflection transformation; and
wherein the symmetry cost is defined as, $$E_T = \sum_i \|q_i + 2(d - n^T q_i)n - p_i\|^2 / 2,$$

where,
n is the normal of T, and
for any point p, $T(p)=p+2(d-n^T p)n$.

10. The non-transitory computer-readable storage medium of claim 8, wherein the software causes the processor to minimize the symmetry cost of the displacements relative to other displacement value pairs by further causing the processor to:
select a rotation given by
$R^*=VU^T$; and
select a corresponding translation vector
$t^*=\bar{q}-R^*\bar{p}$,
where $$\sum_{k=1}^{4m} u_k v_k^T = U \wedge V^T;$$

wherein $C_p=[e_p^1 e_p^2 e_p^3]$ is the local coordinate frame of p consisting of the surface normal and the two principal curvature directions respectively, and the transformation function T comprises a rigid transformation composed of a rotation R followed by a translation t such that $q_i=Rp_i+t$ and $RC_{p_i}=C_{q_i} \forall i$ and
wherein the symmetry cost is defined as, $$E_{(R,t)} = \sum_i \|R\tilde{p}_i - \tilde{q}_i\|^2 + \sum_i \sum_{j=1}^3 \|\sqrt{\lambda}(Re_{p_i}^j - e_{q_i}^j)\|^2$$
$$= \sum_{k=1}^{4m} \|Ru_k - v_k\|^2$$

where $\lambda$ is a positive constant weighting the two error components.

11. A computer system that symmetrizes modeled physical objects, comprising:
processing logic;
memory, coupled to the processing logic, that stores data representing a modeled physical object, said data comprising a plurality of sampled surface points of the modeled object;
a display device, coupled to the processing logic, that presents a graphical representation of the modeled physical object to a user of the computer system; and
an input device that accepts input from the user;
wherein the processing logic:
identifies a plurality of clusters, each comprising a plurality of symmetric point pairs that are each derived from a plurality of sampled surface points of the modeled physical object;
calculates and applies each of a first plurality of displacement value pairs to corresponding sample positions of each of the plurality of symmetric point pairs within at least one cluster of the plurality of clusters, wherein the symmetry of the at least one cluster is increased;
calculates a second plurality of displacement value pairs and contracts the at least one cluster using the second plurality of displacement value pairs;
merges two or more clusters of the plurality of clusters within the transformation space; and
presents a graphical representation of the symmetrized modeled physical object to a user on the display device.

12. The computer system of claim 11, wherein, as at least part of the identification of the plurality of clusters, the processing logic further:
calculates a signature value for each of the plurality of sampled surface point pairs;
includes within the plurality of symmetric point pairs those sampled surface point pairs with a signature value below a signature threshold value;
maps each of the plurality of symmetric point pairs to a corresponding point in the transformation space;
calculates a density value at each transformation space point, each density value being based upon a plurality of transformation space distance metrics between the transformation space point at which the density value is calculated and each of the remaining transformation space points;
identifies one or more density local maximums that exceed a density threshold value;
defines a cluster of the plurality of clusters for each of the one or more identified density local maximums; and
includes within each of the plurality of clusters those transformation space points that flow into an associated identified density local maximum of the one or more identified density local maximums.

13. The computer system of claim 11, wherein, as at least part of the application of each of the first plurality of displacement value pairs, the processing logic further:
displaces each of the points of the plurality of symmetric point pairs in the direction of a corresponding displacement value of the first plurality of displacement values;
projects each of the symmetric point pairs that are displaced off of the modeled physical object back onto said object; and
repeats said displacement and projection until a threshold condition is satisfied.

14. The computer system of claim 11, wherein, as at least part of the contraction of the at least one cluster, the processing logic further:
scales each of the second plurality of displacement values;
calculates new locations for each of the plurality of symmetric point pairs by applying a corresponding scaled displacement value to each point of the plurality of symmetric point pairs within the at least one cluster;
applies a deformation model to the modeled physical object to generate a modified shape, using the new symmetric point pair locations as positional constraints on the deformation model;

repositions the plurality of symmetric points onto the modified shape; and recalculates the second plurality of displacement values and repeats said scaling, new position calculation, deformation model application and symmetric point re-positioning, using said recalculated displacement values, until a threshold condition is satisfied.

15. The computer system of claim 11, wherein the processing logic further contracts at least two clusters of the plurality of clusters in descending transformation space point density order as determined by a point density local maximum corresponding to each of said at least two clusters.

16. The computer system of claim 11, wherein the processing logic further greedily merges the two or more clusters based on the distance between clusters in the transformation space.

17. The computer system of claim 11, wherein the processing logic further merges at least two neighboring clusters of the two or more clusters by moving the points included within said neighboring clusters to a common centroid in the transformation space.

18. The computer system of claim 11, wherein, as at least part of the calculation of the first and second plurality of displacement value pairs, the processing logic further:

selects a transformation function T that produces displacement value pairs that minimize the symmetry cost of the displacements relative to other displacement value pairs;

wherein p and q are one of the plurality of symmetric point pairs $(p_1,q_1), \ldots, (p_m,q_m)$; and wherein the symmetry cost is defined as, $$E = \sum_{i=1}^{m}(\|d_{p_i}\|^2 + \|d_{q_i}\|^2) = 2\sum_{i=1}^{m}\|d_{p_i}\|^2,$$

where, $$d_p = \frac{T^{-1}(q)-p}{2} \text{ and } d_q = \frac{T(p)-q}{2}.$$

19. The computer system of claim 18, wherein, as at least part of the minimization of the symmetry cost of the displacements relative to other displacement value pairs, the processing logic further:

determines the smallest eigenvector $n^*$ of the matrix $(A-bb^T/2m)$, where $A=\Sigma_i(p_iq_i^T+q_ip_i^T)$, $b=\Sigma_i(p_i,q_i)$, and the corresponding distance of the plane of reflection from the origin is given by $d^*=n^{*T}b/2m$;

wherein the transformation function T comprises a reflection transformation; and wherein the symmetry cost is defined as, $$E_T = \sum_i \|q_i + 2(d-n^T q_i)n - p_i\|^2/2,$$

where, n is the normal of T, and for any point p, $T(p)=p+2(d-n^T p)n$.

20. The computer system of claim 18, wherein, as at least part of minimization of the symmetry cost of the displacements relative to other displacement value pairs, the processing logic further:

selects a rotation given by $R^*=VU^T$; and select a corresponding translation vector $t^*=\bar{q}-R^*\bar{p}$, where $$\sum_{k=1}^{4m} u_k v_k^T = U \wedge V^T;$$

wherein $C=[e_p^1 e_p^2 e_p^3]$ is the local coordinate frame of p consisting of the surface normal and the two principal curvature directions respectively, and the transformation function T comprises a rigid transformation composed of a rotation R followed by a translation t such that $q_i=Rp_i+t$ and $RC_{p_i}=C_{q_i}\forall i$ and wherein the symmetry cost is defined as, $$E_{(R,t)} = \sum_i \|R\tilde{p}_i - \tilde{q}_i\|^2 + \sum_i \sum_{j=1}^{3} \left\|\sqrt{\lambda}(Re_{p_i}^j - e_{q_i}^j)\right\|^2$$

$$= \sum_{k=1}^{4m} \|Ru_k - v_k\|^2$$

where $\lambda$ is a positive constant weighting the two error components.

* * * * *

UNITED STATES PATENT AND TRADEMARK OFFICE
CERTIFICATE OF CORRECTION

| | | |
|---|---|---|
| PATENT NO. | : 8,411,081 B2 | Page 1 of 1 |
| APPLICATION NO. | : 12/481197 | |
| DATED | : April 2, 2013 | |
| INVENTOR(S) | : Niloy J. Mitra, Leonidas J. Guibas and Mark Pauly | |

It is certified that error appears in the above-identified patent and that said Letters Patent is hereby corrected as shown below:

In The Specification Under Column 1:

Replace lines 15-22 under Statement Regarding Federally Sponsored Research and Development with the following --

This invention was made with Government support under contracts DAAD19-03-1-0331 awarded by the U.S. Army RDECOM Acquisition Center, 0310661 awarded by the National Science Foundation, GM072970 awarded by the National Institutes of Health, and HR0011-05-1-0007 awarded by the Defense Advanced Research Projects Agency. The United States Government has certain rights in this invention.

Signed and Sealed this
Thirtieth Day of July, 2013

Teresa Stanek Rea
*Acting Director of the United States Patent and Trademark Office*